(12) United States Patent
Shimazu

(10) Patent No.: US 11,826,715 B2
(45) Date of Patent: Nov. 28, 2023

(54) FINE BUBBLE GENERATOR

(71) Applicant: RINNAI CORPORATION, Nagoya (JP)

(72) Inventor: Tomoyuki Shimazu, Nagoya (JP)

(73) Assignee: RINNAI CORPORATION, Nagoya (JP)

(*) Notice: Subject to any disclaimer, the term of this patent is extended or adjusted under 35 U.S.C. 154(b) by 0 days.

(21) Appl. No.: 17/805,184

(22) Filed: Jun. 2, 2022

(65) Prior Publication Data

US 2022/0387946 A1   Dec. 8, 2022

(30) Foreign Application Priority Data

Jun. 3, 2021   (JP) ................................ 2021-093629

(51) Int. Cl.

| *B01F 3/04* | (2006.01) |
| *B01F 23/232* | (2022.01) |
| *B01F 25/50* | (2022.01) |
| *B01F 23/23* | (2022.01) |
| *B01F 23/2373* | (2022.01) |

(52) U.S. Cl.
CPC ...... *B01F 23/2323* (2022.01); *B01F 23/2366* (2022.01); *B01F 23/2373* (2022.01); *B01F 25/50* (2022.01)

(58) Field of Classification Search
CPC .............. B01F 23/2323; B01F 23/2366; B01F 23/2373; B01F 25/50
USPC .......................................................... 261/84
See application file for complete search history.

(56) References Cited

U.S. PATENT DOCUMENTS

| 4,370,304 | A  | 1/1983  | Hendriks et al. |
| 6,969,052 | B2 | 11/2005 | Korzeniowski |
| 10,695,726 | B2 | 6/2020  | Tian et al. |
| 11,077,411 | B2 | 8/2021  | Shibata et al. |
| 11,331,910 | B2 | 5/2022  | Arimizu et al. |
| 2007/0205523 | A1 | 9/2007  | Kojima |
| 2017/0304782 | A1 | 10/2017 | Wu |

(Continued)

FOREIGN PATENT DOCUMENTS

| CN | 111821871 A | * 10/2020 | .......... B01F 23/2366 |
| CN | 115555913 A |   1/2023 | |

(Continued)

OTHER PUBLICATIONS

English translation of CN 111821871 A (Year: 2020).*

*Primary Examiner* — Charles S Bushey
(74) *Attorney, Agent, or Firm* — K&L Gates LLP

(57) ABSTRACT

A fine bubble generator may include an inlet, an outlet, a first fine bubble generation portion including a first flow path, and a second fine bubble generation portion including a second flow path. The first flow path may include a diameter-reducing flow path and a diameter-increasing flow path. The second flow path may include a guide flow path and a collision flow path disposed downstream of the guide flow path. A first bearing and a first impeller rotatably attached to the first bearing may be disposed on the collision flow path. The first impeller may include a disc disposed at a position at which the gas-dissolved water collides with the disc; a first rotation shaft disposed on a downstream surface of the disc and rotatably attached to the first bearing; and one or more first vanes disposed on an upstream surface of the disc.

7 Claims, 12 Drawing Sheets

(56) References Cited

U.S. PATENT DOCUMENTS

| | | |
|---|---|---|
| 2018/0023600 A1 | 1/2018 | Komazawa et al. |
| 2019/0176100 A1 | 6/2019 | Shibata et al. |
| 2021/0331124 A1 | 10/2021 | Shibata et al. |
| 2022/0387945 A1* | 12/2022 | Shimazu ............. B01F 23/2373 |
| 2022/0387946 A1 | 12/2022 | Shimazu |
| 2023/0009590 A1* | 1/2023 | Shimazu ............. B01F 25/4335 |

FOREIGN PATENT DOCUMENTS

| | | |
|---|---|---|
| JP | 2002263678 A | 9/2002 |
| JP | 2008018330 A | 1/2008 |
| JP | 6048841 B2 | 12/2016 |
| JP | 6077627 B1 | 1/2017 |
| JP | 2018008193 A | 1/2018 |
| JP | 2019166493 A | 10/2019 |
| KR | 10-2021-0148481 A | 12/2021 |
| WO | 2014084301 A1 | 6/2014 |

* cited by examiner

Upstream Side ←——→ Downstream Side

Upstream Side ←——→ Downstream Side

FINE BUBBLE GENERATOR

CROSS-REFERENCE TO RELATED APPLICATION

This application claims priority to Japanese Patent Application No. 2021-093629 filed on Jun. 3, 2021, the contents of which are hereby incorporated by reference into the present application.

TECHNICAL FIELD

The art disclosed herein relates to a fine bubble generator.

BACKGROUND ART

Japanese Patent Application Publication No. 2018-8193 describes a fine bubble generator that includes an inlet into which gas-dissolved water in which gas is dissolved flows, an outlet out of which the gas-dissolved water flows, and a fine bubble generation portion disposed between the inlet and the outlet. The fine bubble generation portion includes a diameter-reducing flow path of which flow path diameter reduces from upstream to downstream, and a diameter-increasing flow path disposed downstream than the diameter-reducing flow path and having a flow path diameter that increases from upstream to downstream.

SUMMARY

In the fine bubble generator of JP 2018-8193 A, the water in which gas is dissolved (which may hereinbelow termed "gas-dissolved water") flows into the diameter-reducing flow path in the fine bubble generation portion via the inlet. A flow speed of the gas-dissolved water increases as it flows through the diameter-reducing flow path, as a result of which its pressure is reduced. Bubbles are generated as a result of this pressure reduction of the gas-dissolved water. Then, the pressure of the gas-dissolved water is gradually increased as the gas-dissolved water flows through the diameter-increasing flow path. When the pressure of the gas-dissolved water is increased after the bubbles were generated by the pressure reduction, the bubbles included in the gas-dissolved water break up into fine bubbles. As above, in the fine bubble generator, the fine bubbles are generated by the fine bubble generation portion. However, in the above fine bubble generator, a situation may occur in which the fine bubbles generated by the fine bubble generator is insufficient in volume.

The description herein provides an art configured to generate fine bubbles in large volume.

A fine bubble generator disclosed herein may comprise: an inlet into which gas-dissolved water in which gas is dissolved flows; an outlet out of which the gas-dissolved water flows; a first fine bubble generation portion disposed between the inlet and the outlet and comprising a first flow path; and a second fine bubble generation portion disposed between the first fine bubble generation portion and the outlet and comprising a second flow path, wherein the first flow path comprises: a diameter-reducing flow path, wherein a flow path diameter of the diameter-reducing flow path reduces from upstream to downstream, and a diameter-increasing flow path disposed downstream than the diameter-reducing flow path, wherein a flow path diameter of the diameter-increasing flow path increases from upstream to downstream, the second flow path comprises: a guide flow path guiding the gas-dissolved water flowing into the second flow path in a center direction toward a flow path axis of the second flow path, and a collision flow path disposed downstream of the guide flow path and defined by a collision flow path wall, wherein a first bearing and a first impeller rotatably attached to the first bearing are disposed on the collision flow path, wherein the first impeller comprises: a disc disposed at a position at which the gas-dissolved water having passed through the guide flow path collides with the disc and disposed orthogonal to the flow path axis of the second flow path; a first rotation shaft disposed on a downstream surface of the disc and rotatably attached to the first bearing; and one or more first vanes disposed on an upstream surface of the disc.

According to the above configuration, the gas-dissolved water flows into the diameter-reducing flow path in the first fine bubble generation portion via the inlet. A flow speed of the gas-dissolved water increases as it flows through the diameter-reducing flow path, as a result of which its pressure is reduced. Bubbles are generated as a result of this pressure reduction of the gas-dissolved water. Then, the pressure of the gas-dissolved water is gradually increased as the gas-dissolved water flows through the diameter-increasing flow path. When the pressure of the gas-dissolved water is increased after the bubbles were generated by the pressure reduction, the bubbles included in the gas-dissolved water break up into fine bubbles. The gas-dissolved water having flowed through the first fine bubble generation portion then flows into the second fine bubble generation portion. The gas-dissolved water that flowed into the second fine bubble generation portion flows through the guide flow path and into the collision flow path, and collides with the disc of the first impeller disposed on the collision flow path. Since the gas-dissolved water that flowed into the second fine bubble generation portion is guided, by the guide flow path, in the center direction toward the flow path axis of the second flow path, that is, along the center direction of the disc, majority of the gas-dissolved water collides with the disc in vicinity of a central area thereof. Due to the one or more first vanes being disposed on the upstream surface of the disc, the gas-dissolved water having collided with the disc flows along the first vane(s), by which the disc rotates relative to the first bearing. As the disc rotates relative to the first bearing, the gas-dissolved water flowing along the first vane(s) is guided off of the disc radially outward, and collides with the collision flow path wall defining the collision flow path. When the gas-dissolved water collides with the collision flow path wall, the fine bubbles generated in the first fine bubble generation portion further break up into even finer bubbles, and a volume of the fine bubbles thereby increases. Thus, the fine bubbles can be generated in large volume.

DETAILED DESCRIPTION

Figure 1:
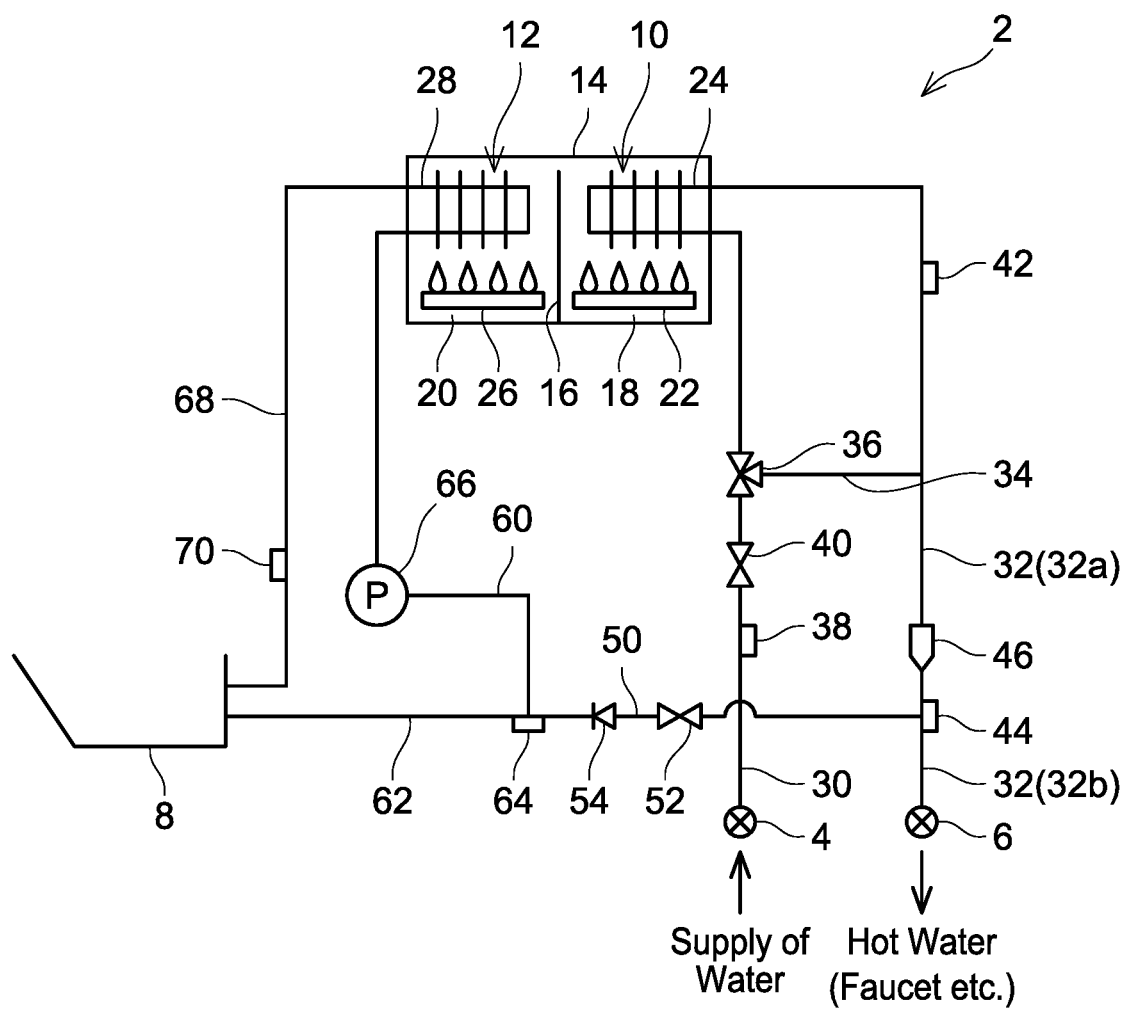
FIG. 1 schematically shows a configuration of a hot water supply system 2 of an embodiment.

A fine bubble generator disclosed herein may comprise: an inlet into which gas-dissolved water in which gas is dissolved flows; an outlet out of which the gas-dissolved water flows; a first fine bubble generation portion disposed between the inlet and the outlet and comprising a first flow path; and a second fine bubble generation portion disposed between the first fine bubble generation portion and the outlet and comprising a second flow path, wherein the first flow path comprises: a diameter-reducing flow path, wherein a flow path diameter of the diameter-reducing flow path reduces from upstream to downstream, and a diameter-increasing flow path disposed downstream than the diameter-reducing flow path, wherein a flow path diameter of the diameter-increasing flow path increases from upstream to downstream, the second flow path comprises: a guide flow path guiding the gas-dissolved water flowing into the second flow path in a center direction toward a flow path axis of the second flow path, and a collision flow path disposed downstream of the guide flow path and defined by a collision flow path wall, wherein a first bearing and a first impeller rotatably attached to the first bearing are disposed on the collision flow path, wherein the first impeller comprises: a disc disposed at a position at which the gas-dissolved water having passed through the guide flow path collides with the disc and disposed orthogonal to the flow path axis of the second flow path; a first rotation shaft disposed on a downstream surface of the disc and rotatably attached to the first bearing; and one or more first vanes disposed on an upstream surface of the disc.

In one or more embodiments, the fine bubble generator may further comprise a third fine bubble generation portion disposed between the first fine bubble generation portion and the outlet and comprising a third flow path. A second bearing and a second impeller may be disposed on the third flow path. The second impeller may comprise: a second rotation shaft rotatably attached to the second bearing and extending along a flow path axis of the third flow path; and one or more second vanes connected to the second rotation shaft and extending radially outward from the second rotation shaft.

According to the above configuration, the gas-dissolved water having flowed through the first fine bubble generation portion flows into the third flow path of the third fine bubble generation portion. The second impeller rotates relative to the second bearing by the gas-dissolved water colliding with the second vane(s) of the second impeller disposed on the third flow path. Further, the fine bubbles in the gas-dissolved water flowing through the second impeller are sheared by the rotating second vane(s) upon when the gas-dissolved water passes through the second impeller. Due to this, the fine bubbles in the gas-dissolved water are further broken up into even finer bubbles, and the volume of the fine bubbles thereby increases.

In one or more embodiments, the third fine bubble generation portion may further comprise a rib disposed downstream than the one or more second vanes and connecting the second bearing and a wall that defines the third flow path.

According to the above configuration, when the gas-dissolved water having flowed through the second impeller flows past the rib, the fine bubbles in the gas-dissolved water are sheared by the rib. Due to this, the fine bubbles in the gas-dissolved water are further broken up into even finer bubbles, and the volume of the fine bubbles thereby increases.

In one or more embodiments, the second fine bubble generation portion may be disposed between the third fine bubble generation portion and the outlet.

In the second fine bubble generation portion, the gas-dissolved water collides with the disc and the collision flow path wall, by which a flowing direction of the gas-dissolved water changes dynamically. On the other hand, in the third fine bubble generation portion, the flowing direction of the gas-dissolved water does not change dynamically. Due to this, a pressure loss in the second flow path of the second fine bubble generation portion is greater than a pressure loss in the third flow path of the third fine bubble generation portion, as a result of which the flow of the gas-dissolved water is prone to stagnation. By causing the gas-dissolved water of which flow has not yet stagnated to flow into the third fine bubble generation portion, the fine bubbles can be generated in large volume. According to the above configuration, as compared to a configuration in which the third fine bubble generation portion is disposed between the second fine bubble generation portion and the outlet, the pressure loss that occurs before flowing into the third fine bubble generation portion can be reduced, and the gas-dissolved water of which flow has not yet stagnated flows into the second fine bubble generation portion. Thus, in the third fine bubble generation portion, the gas-dissolved water can more easily be sheared, as a result of which a larger volume of the fine bubbles can be generated.

In one or more embodiments, an axial extension portion may be further disposed on the collision flow path. The axial extension portion may be disposed between the collision flow path wall and the first impeller in a radial direction of the first rotation shaft, and extend in an axial direction of the first rotation shaft.

By increasing the number of times the gas-dissolved water collides, the fine bubbles are further refined, and the volume of the fine bubbles is increased. According to the above configuration, a part of the gas-dissolved water that was guided off of the disc radially outward collides with the axial extension portion, and thereafter collides with the collision flow path wall. Due to this, as compared to a configuration in which the axial extension portion is not arranged on the collision flow path, the number of times the gas-dissolved water collides can be increased. Thus, the fine bubbles in the gas-dissolved water are further refined into finer bubbles, and the volume of the fine bubbles is increased.

In one or more embodiments, each of the one or more first vanes may comprise a first end disposed on an inner side in the radial direction of the first rotation shaft and a second end on an outer side in the radial direction of the first rotation shaft. The first end may be disposed more on a first rotation direction side than the second end is. The axial extension portion may comprise a third end on the inner side in the radial direction and a fourth end disposed on the outer side in the radial direction. The third end may be disposed more on a second rotation direction side than the fourth end is. The second rotation direction side may be opposite to the first rotation direction side.

According to the above configuration, the disc rotates relative to the first bearing in the first rotation direction as the gas-dissolved water that collided with the disc flows past the first vane(s). Then, the gas-dissolved water that is guided off of the first impeller radially outward is guided along the radially outward direction as it flows in a second rotation direction, which is opposite to the first rotation direction. Since the third end of the axial extension portion is disposed more on the second rotation direction side than the fourth end is, the gas-dissolved water that flowed radially outward can easily collide with the axial extension portion. Further, the gas-dissolved water that collided with the axial extension portion flows radially outward, that is, toward the collision flow path wall. Due to this, the gas-dissolved water that collided with the axial extension portion can be guided to collide with the collision flow path wall. Thus, the number of times the gas-dissolved water collides can be increased, by which the fine bubbles in the gas-dissolved water are further refined into finer bubbles, and the volume of the fine bubbles is increased.

Embodiments (Configuration of Hot Water Supply System 2; FIG. 1)

A hot water supply system 2 shown in FIG. 1 is configured to heat water supplied from a water source 4 such as a public tap water system, and deliver the water heated to a desired temperature to a faucet 6 installed in a kitchen or a bathtub 8 installed in a bathroom. Further, the hot water supply system 2 is configured capable of reheating the water in the bathtub 8.

The hot water supply system 2 includes a first heating device 10, a second heating device 12, and a burner chamber 14. The first heating device 10 is a heating device used to supply hot water to the faucet 6 and the bathtub 8. The second heating device 12 is a heating device used to reheat the water in the bathtub 8. Inside of the burner chamber 14 is partitioned into a first burner chamber 18 and a second burner chamber 20 by a wall 16. The first heating device 10 is housed in the first burner chamber 18 and the second heating device 12 is housed in the second burner chamber 20.

The first heating device 10 includes a first burner 22 and a first heat exchanger 24. The second heating device 12 includes a second burner 26 and a second heat exchanger 28.

An upstream end of the first heat exchanger 24 of the first heating device 10 is connected to a downstream end of a water supply passage 30. Water from the water source 4 is supplied to an upstream end of the water supply passage 30. A downstream end of the first heat exchanger 24 is connected to an upstream end of a hot water supply passage 32. The water supply passage 30 and the hot water supply passage 32 are connected by a bypass passage 34. A bypass servo valve 36 is disposed at a connection between the water supply passage 30 and the bypass passage 34. The bypass servo valve 36 is configured to adjust a flow rate of the water sent from the water supply passage 30 to the first heating device 10 and a flow rate of the water sent from the water supply passage 30 to the bypass passage 34. Low-temperature water delivered through the water supply passage 30 and the bypass passage 34 is mixed with high-temperature water delivered through the water supply passage 30, the first heating device 10, and the hot water supply passage 32 at a connection between the bypass passage 34 and the hot water supply passage 32. A water flow metering sensor 38 and a water flow servo valve 40 are disposed on the water supply passage 30 upstream of the bypass servo valve 36. The water flow metering sensor 38 is configured to detect a flow rate of the water that flows in the water supply passage 30. The water flow servo valve 40 is configured to adjust the flow rate of the water that flows in the water supply passage 30. A heat exchanger outlet thermistor 42 is disposed on the hot water supply passage 32 upstream of the connection thereof with the bypass passage 34.

An upstream end of a bathtub-filling passage 50 is connected to the hot water supply passage 32 downstream of the connection thereof with the bypass passage 34. A hot water-supplying thermistor 44 is disposed at a connection between the hot water supply passage 32 and the bathtub-filling passage 50. A fine bubble generator 46 is disposed between the connection of the hot water supply passage 32 and the bypass passage 34 and a connection of the hot water supply passage 32 and the bathtub-filling passage 50. The fine bubble generator 46 will be described later in detail. Hereinbelow, a part of the hot water supply passage 32 upstream of the fine bubble generator 46 may be termed a first hot water supply passage 32a, and a part of the hot water supply passage 32 downstream of the fine bubble generator 46 may be termed a second hot water supply passage 32b.

A downstream end of the bathtub-filling passage 50 is connected to an upstream end of a reheating passage 60 and a downstream end of a first bathtub circulation passage 62. A downstream end of the reheating passage 60 is connected to an upstream end of the second heat exchanger 28. An upstream end of the first bathtub circulation passage 62 is connected to the bathtub 8. A reheating control valve 52 and a check valve 54 are disposed on the bathtub-filling passage 50. The reheating control valve 52 is configured to open and close the bathtub-filling passage 50. The check valve 54 is configured to allow a waterflow from upstream to downstream of the bathtub-filling passage 50 and prohibit a waterflow from downstream to upstream of the bathtub-filling passage 50. A bathtub returning thermistor 64 is disposed at a connection between the bathtub-filling passage 50, the reheating passage 60, and the first bathtub circulation passage 62. A circulation pump 66 is disposed on the reheating passage 60.

A downstream end of the second heat exchanger 28 of the second heating device 12 is connected to an upstream end of a second bathtub circulation passage 68. A downstream end of the second bathtub circulation passage 68 is connected to the bathtub 8. A bathtub outflow thermistor 70 is disposed on the second bathtub circulation passage 68.

When the hot water supply system 2 is to supply hot water to the faucet 6, the first burner 22 of the first heating device 10 operates with the reheating control valve 52 closed. In this case, the water supplied from the water source 4 to the water supply passage 30 is heated by heat exchange in the first heat exchanger 24 and is then delivered to the faucet 6 through the hot water supply passage 32. A temperature of the water flowing in the hot water supply passage 32 can be adjusted to a desired temperature by adjusting a combustion amount of the first burner 22 of the first heating device 10 and an opening degree of the bypass servo valve 36.

When the hot water supply system 2 is to fill the bathtub 8 with hot water, the first burner 22 of the first heating device 10 operates with the reheating control valve 52 open. In this case, the water supplied from the water source 4 to the water supply passage 30 is heated by the heat exchange in the first heat exchanger 24 and then flows into the bathtub-filling passage 50 from the hot water supply passage 32. The water that has been adjusted to a desired temperature by adjustments of the combustion amount of the first burner 22 of the first heating device 10 and the opening degree of the bypass servo valve 36 flows into the bathtub-filling passage 50. The water that flowed into the bathtub-filling passage 50 flows into the bathtub 8 through the first bathtub circulation passage 62 and also through the reheating passage 60 and the second bathtub circulation passage 68.

When the hot water supply system 2 is to reheat the water in the bathtub 8, the circulation pump 66 operates with the reheating control valve 52 closed, and the second burner 26 of the second heating device 12 is operated. In this case, the water in the bathtub 8 flows into the first bathtub circulation passage 62 and is sent to the second heating device 12 through the reheating passage 60. The water sent to the second heating device 12 is heated by heat exchange in the second heat exchanger 28, and then flows into the second bathtub circulation passage 68. The water that has been adjusted to a desired temperature by an adjustment of a combustion amount of the second burner 26 of the second heating device 12 flows into the second bathtub circulation passage 68. The water that flowed into the second bathtub circulation passage 68 is returned into the bathtub 8.

(Configuration of Fine Bubble Generator 46; FIGS. 2 to 14)

Figure 2:
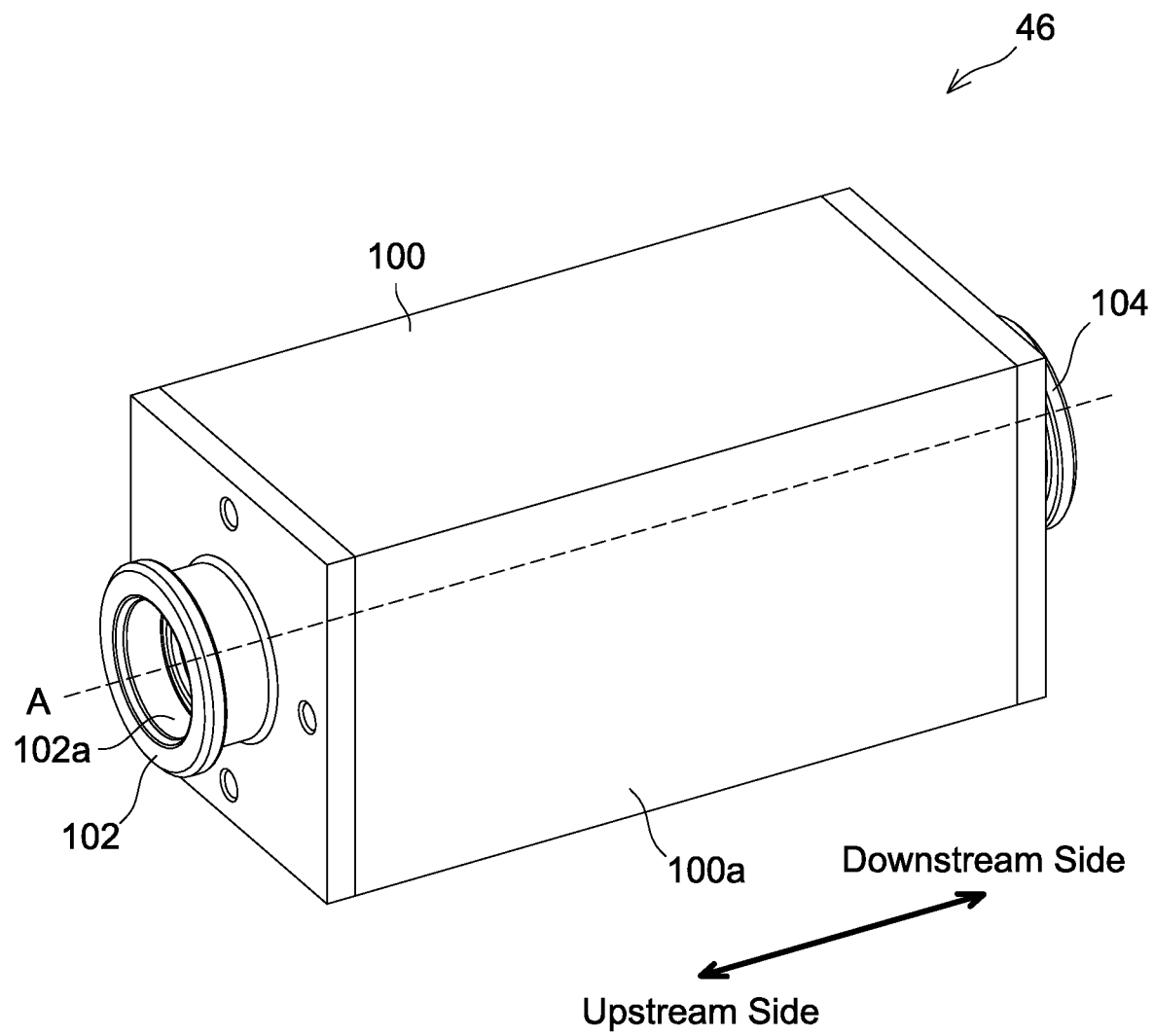
FIG. 2 is a perspective view of a fine bubble generator 46 of the embodiment.
Figure 3:
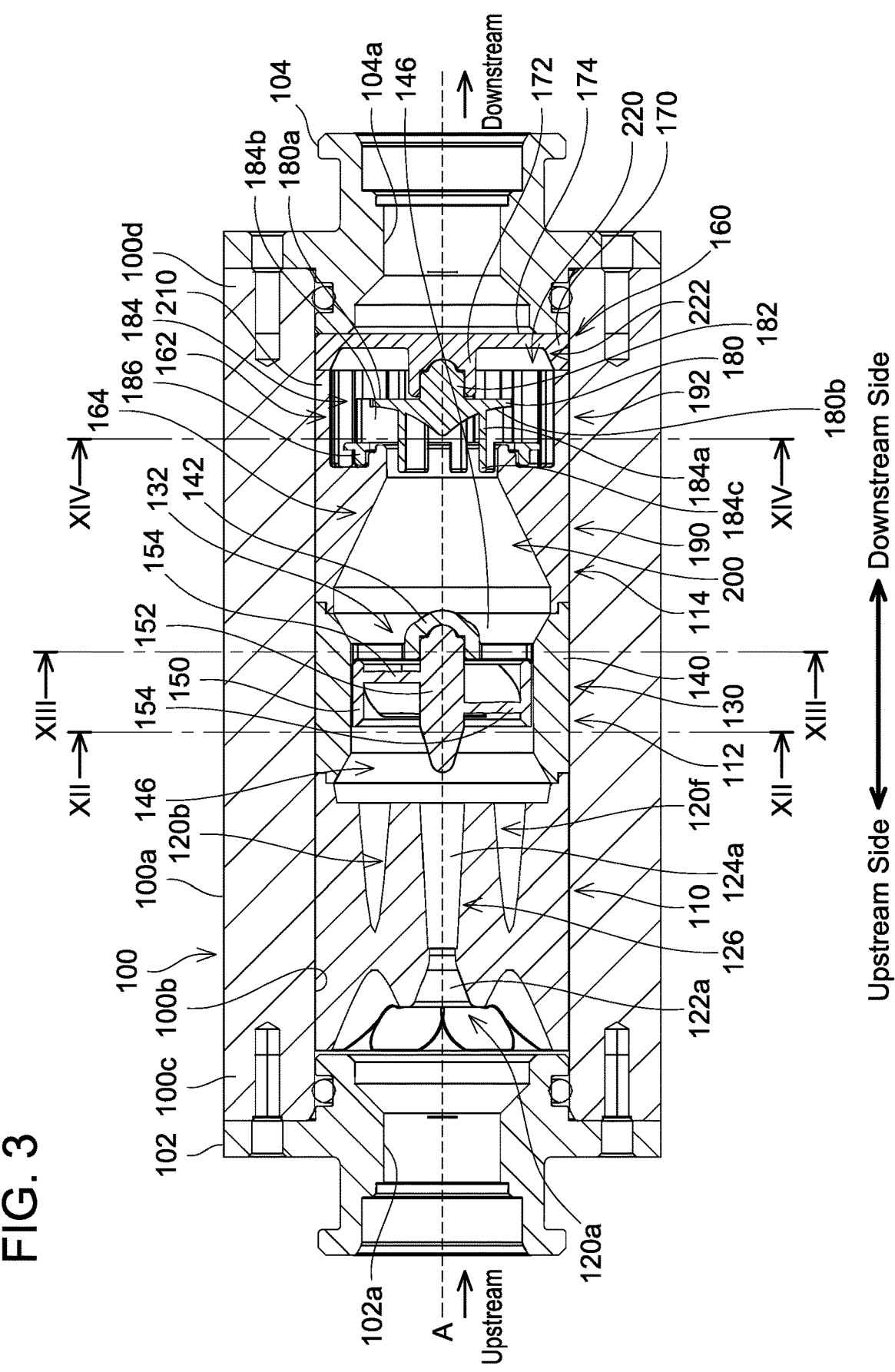
FIG. 3 is a cross-sectional view of the fine bubble generator 46 of the embodiment.
Figure 11:
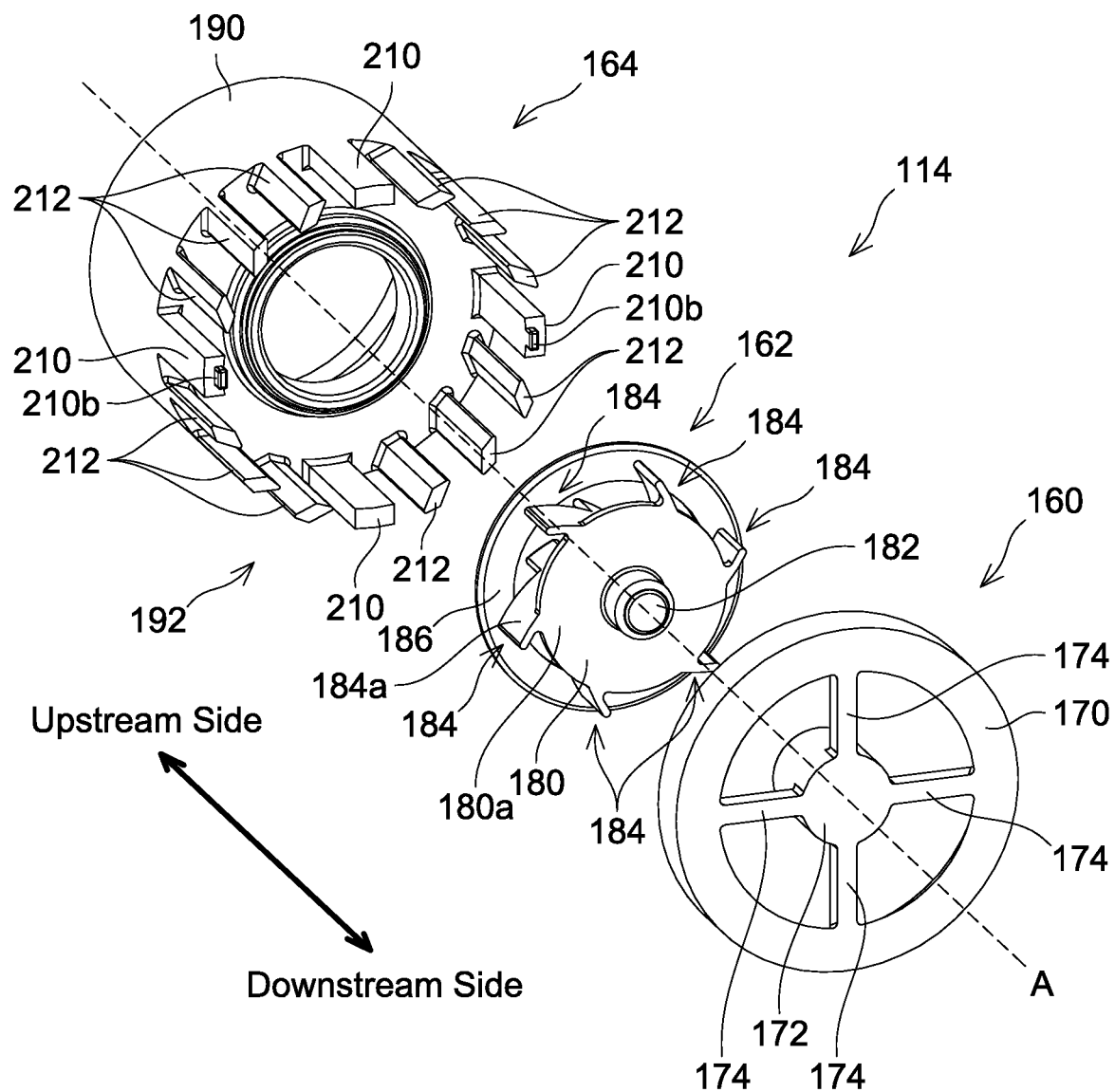
FIG. 11 is a disassembled diagram seeing the downstream fine bubble generation portion 114 of the embodiment from the downstream side.
Figure 12:
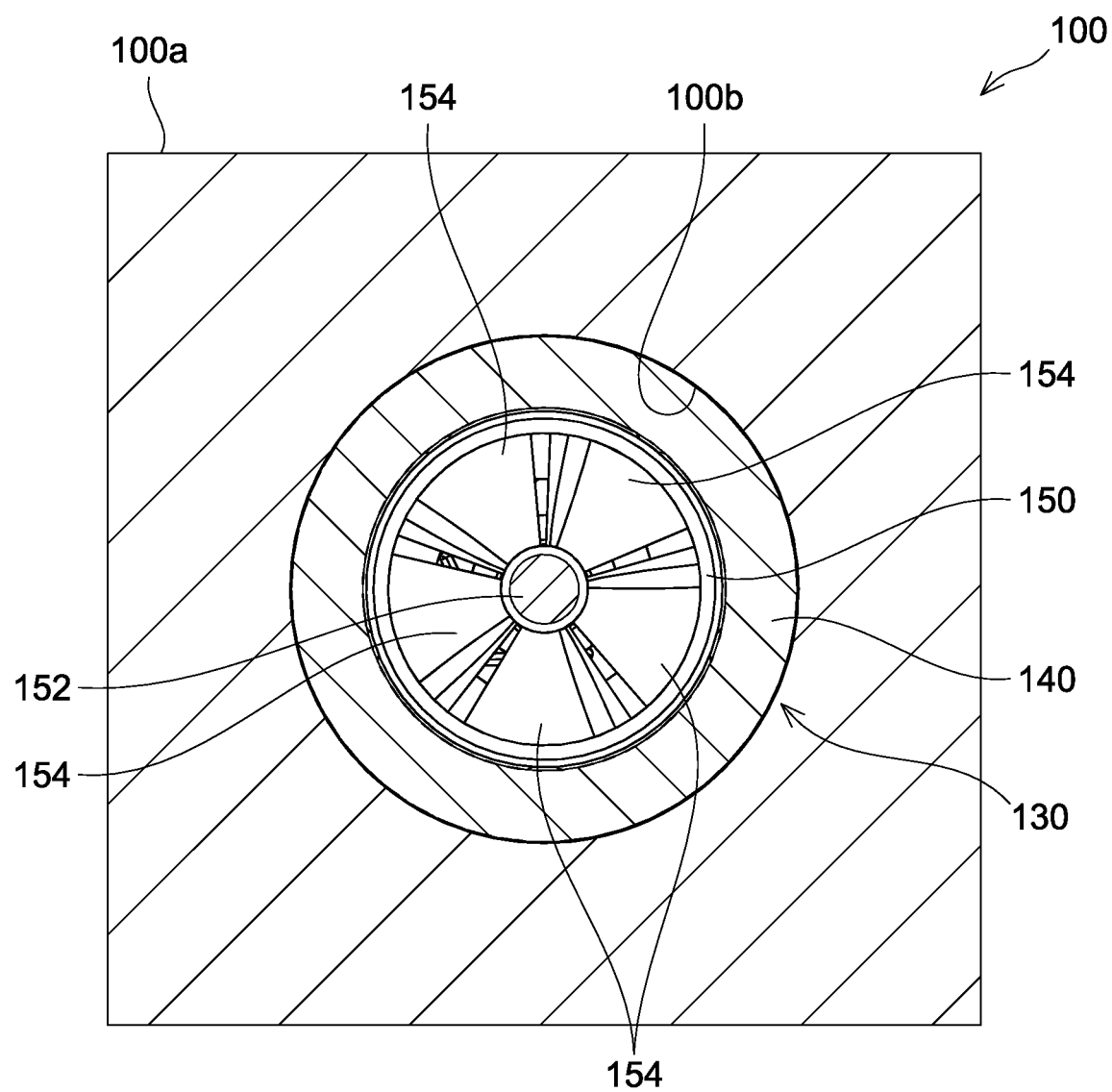
FIG. 12 is a cross-sectional view along a line XII-XII of FIG. 3.

Next, the fine bubble generator 46 disposed on the hot water supply passage 32 will be described with reference to FIGS. 2 to 14. A "clockwise direction" and a "counterclockwise direction" described hereinbelow refer to such directions in viewing the fine bubble generator 46 from an upstream side along a direction of a center axis A of the fine bubble generator 46. Hereinbelow, the center axis A of the fine bubble generator 46 may simply be termed "the center axis A". As shown in FIG. 2, the fine bubble generator 46 includes a main body casing 100, an inlet 102, and an outlet 104. An outer wall 100a of the main body casing 100 has a square columnar shape. A center axis of the main body casing 100 coincides with the center axis A. As shown in FIG. 12, when the fine bubble generator 46 is seen along the center axis A direction, an inner wall 100b of the main body casing 100 has a circular shape. The inlet 102 of FIG. 3 is fixed to an upstream end 100c of the main body casing 100 by screws (not shown). An inlet opening 102a is defined in the inlet 102. The inlet 102 is connected to a downstream end of the first hot water supply passage 32a (see FIG. 1). The outlet 104 is fixed to a downstream end 100d of the main body casing 100 by screws (not shown). An outlet opening 104a is defined in the outlet 104. The outlet 104 is connected to an upstream end of the second hot water supply passage 32b (see FIG. 1).

The main body casing 100 houses an upstream fine bubble generation portion 110, an intermediate fine bubble generation portion 112, and a downstream fine bubble generation portion 114. The upstream fine bubble generation portion 110, the intermediate fine bubble generation portion 112, and the downstream fine bubble generation portion 114 are arranged along the center axis A. The upstream fine bubble generation portion 110, the intermediate fine bubble generation portion 112, and the downstream fine bubble generation portion 114 are arranged in the order of the upstream fine bubble generation portion 110, the intermediate fine bubble generation portion 112, and the downstream fine bubble generation portion 114 from the upstream side to the downstream side.

(Configuration of Upstream Fine Bubble Generation Portion 110; FIGS. 3 to 7)

Figure 4:
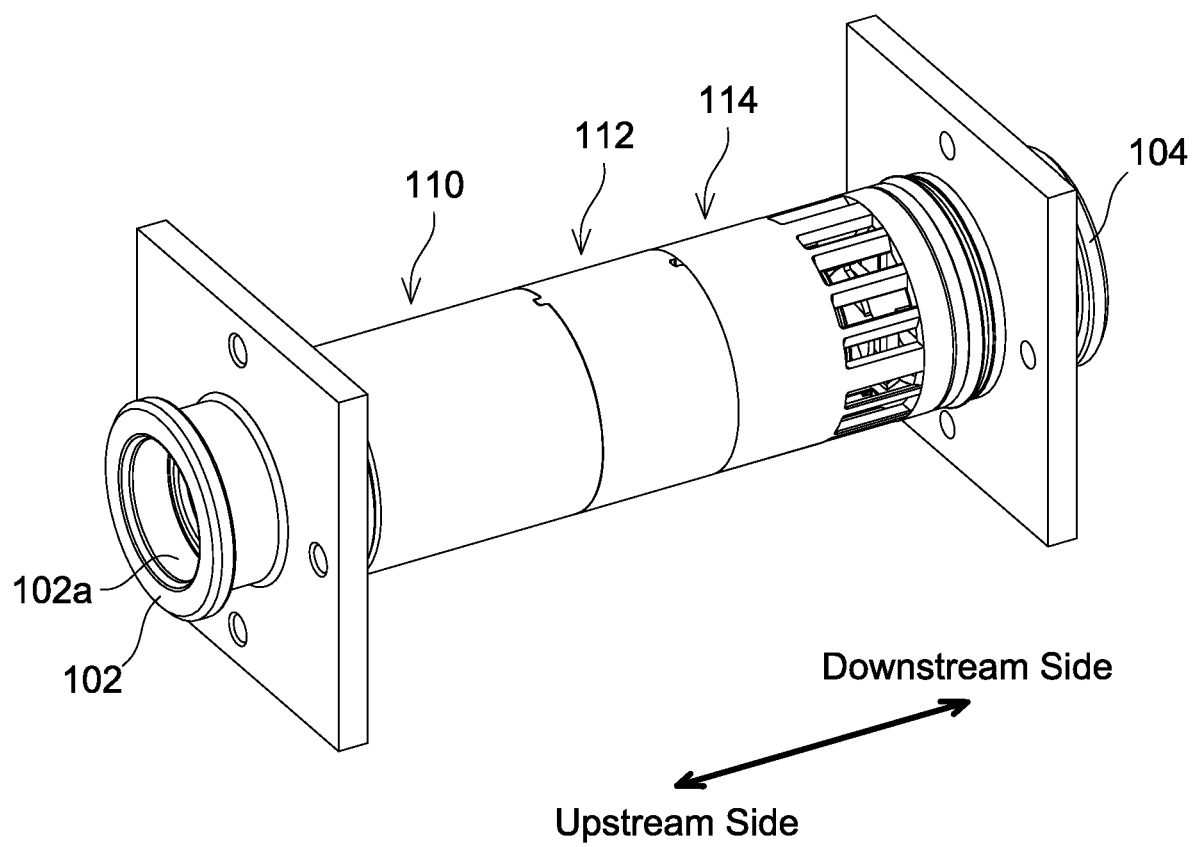
FIG. 4 is a perspective view in a state of having detached a main body casing 100 of the fine bubble generator 46 of the embodiment.
Figure 5:
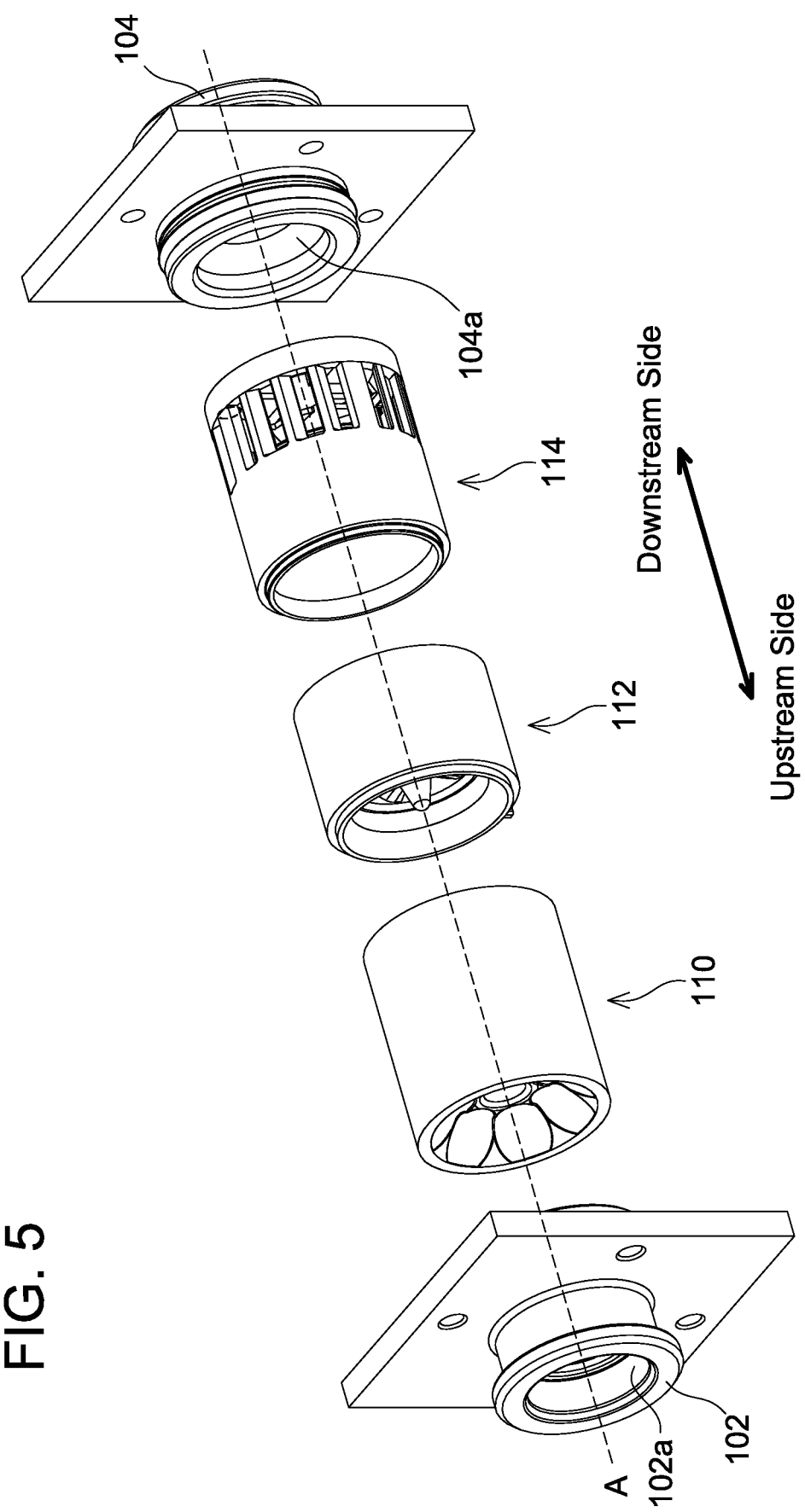
FIG. 5 is a disassembled view of FIG. 4.

Next, the upstream fine bubble generation portion 110 will be described with reference to FIGS. 3 to 7. As shown in FIGS. 3 and 4, the upstream fine bubble generation portion 110 has a cylindrical shape. As shown in FIG. 3, an outer diameter of the upstream fine bubble generation portion 110 is same as an inner diameter of the main body casing 100. A center axis of the upstream fine bubble generation portion 110 coincides with the center axis A.

Figure 6:
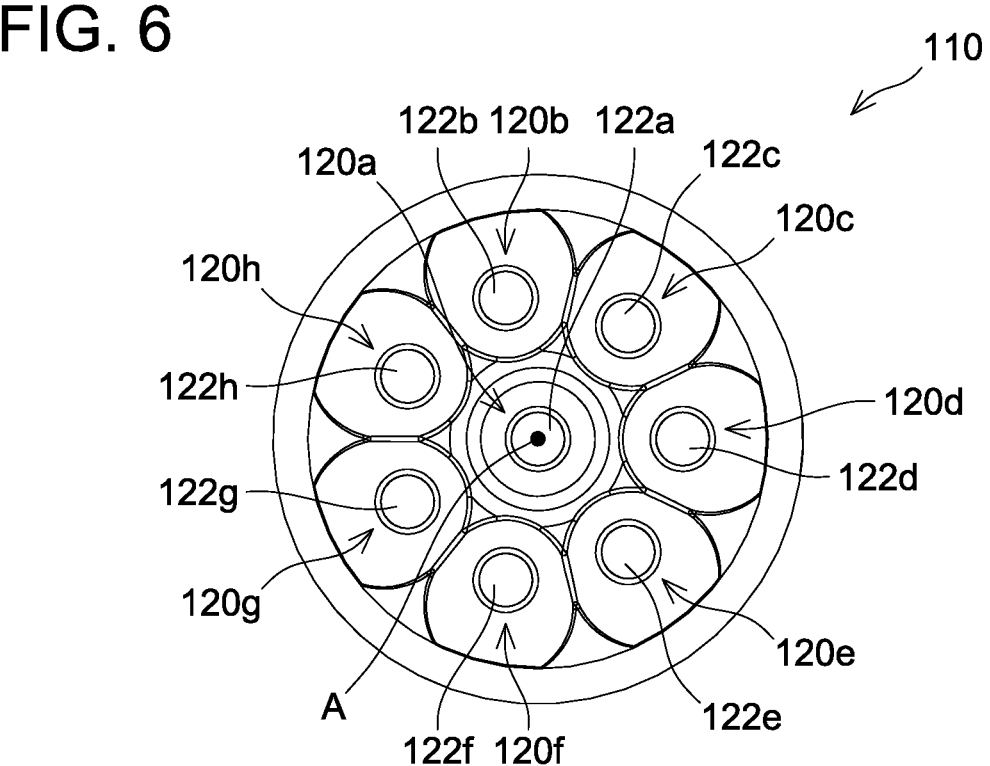
FIG. 6 is a diagram seeing an upstream fine bubble generation portion 110 of the embodiment from an upstream side.
Figure 7:
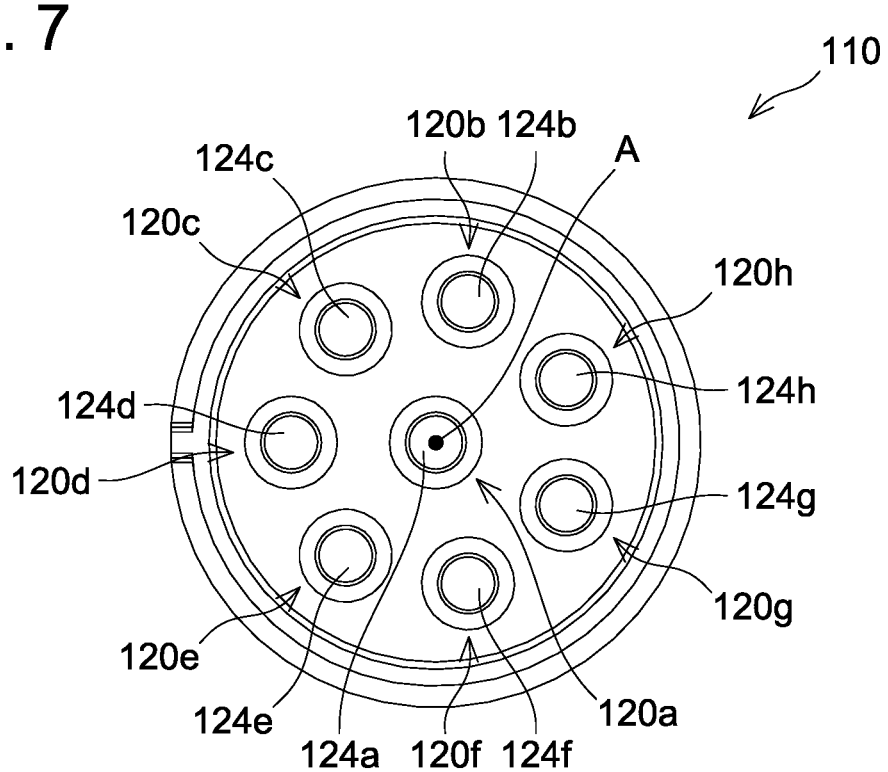
FIG. 7 is a diagram seeing the upstream fine bubble generation portion 110 of the embodiment from a downstream side.

As shown in FIGS. 3, 6, and 7, the upstream fine bubble generation portion 110 includes eight venturi portions 120a to 120h. The venturi portion 120a is disposed in a central area of the upstream fine bubble generation portion 110. The venturi portion 120a is arranged on the center axis A. As shown in FIG. 3, a diameter-reducing flow path 122a of which flow path diameter reduces from upstream to downstream is disposed in an upstream portion of the venturi portion 120a. A flow path diameter of an upstream end of the diameter-reducing flow path 122a is smaller than a flow path diameter of the inlet opening 102a of the inlet 102. A diameter-increasing flow path 124a of which flow path diameter increases from upstream to downstream is disposed in the venturi portion 120a downstream of the diameter-reducing flow path 122a.

As shown in FIGS. 6 and 7, the venturi portions 120b to 120h are disposed radially outside the venturi portion 120a with respect to the center axis A. The venturi portions 120b to 120h are arranged at regular intervals along a circumferential direction about the center axis A. The venturi portions 120b to 120h respectively include corresponding pairs of diameter-reducing flow paths 122b to 122h (see FIG. 6) and diameter-increasing flow paths 124b to 124h (see FIG. 7) similar to the venturi portion 120a. An upstream flow path 126 in the upstream fine bubble generation portion 110 is defined by the diameter-reducing flow paths 122a to 122h and the diameter-increasing flow paths 124a to 124h. The number of the venturi portions 120 disposed in the upstream fine bubble generation portion 110 is not limited to eight; it may be any of one to seven, or may be nine or more. As shown in FIG. 3, water that flows into the upstream fine bubble generation portion 110 from the inlet 102 flows into the intermediate fine bubble generation portion 112 through the upstream flow path 126.

(Configuration of Intermediate Fine Bubble Generation Portion 112; FIGS. 3 to 5, 8, and 9)

Figure 8:
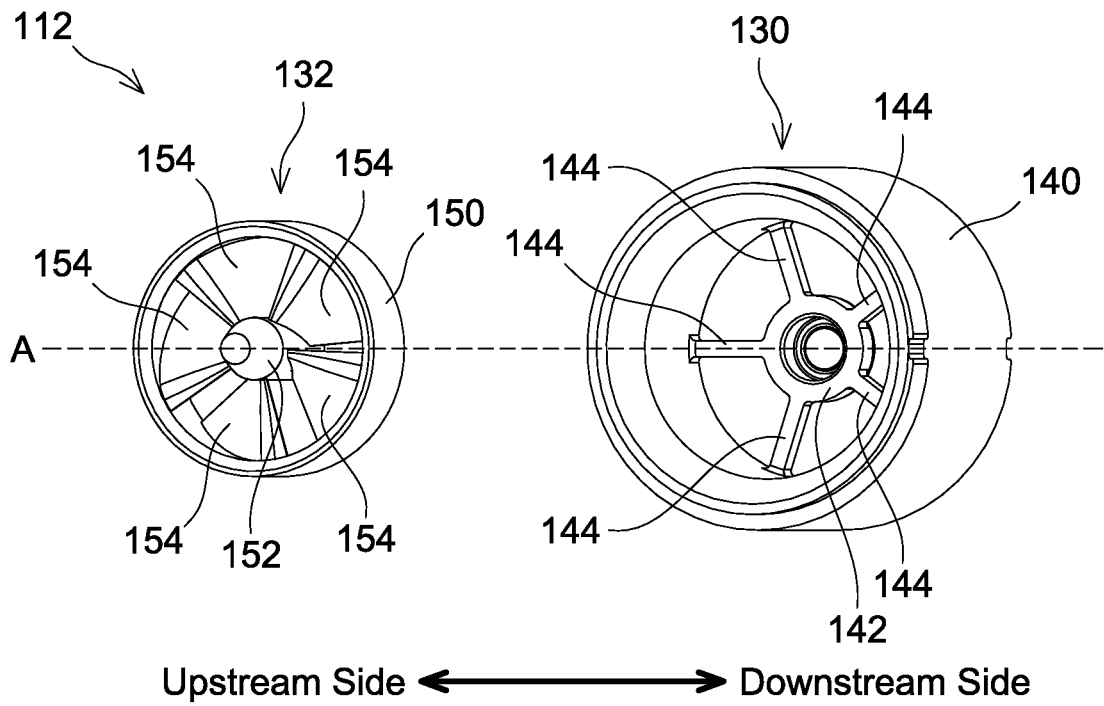
FIG. 8 is a diagram seeing an intermediate fine bubble generation portion 112 of the embodiment from the upstream side.
Figure 9:
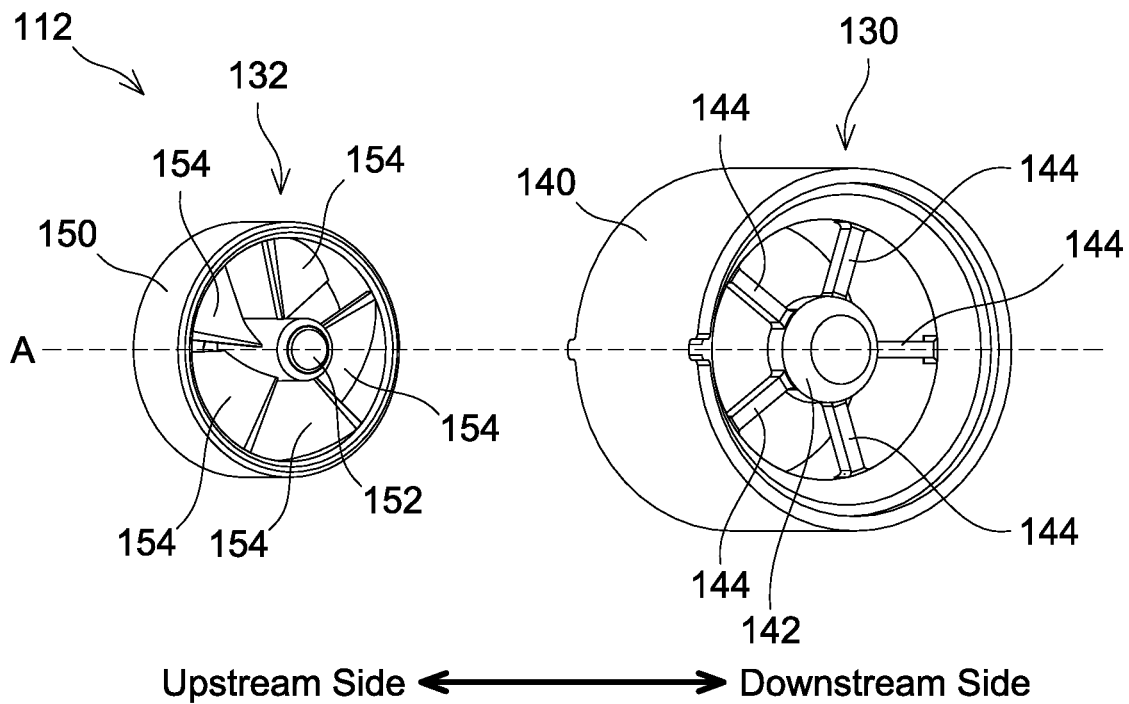
FIG. 9 is a diagram seeing the intermediate fine bubble generation portion 112 of the embodiment from the downstream side.

Next, the intermediate fine bubble generation portion 112 will be described with reference to FIGS. 3 to 5, 8, and 9. As shown in FIGS. 8 and 9, the intermediate fine bubble generation portion 112 includes an intermediate stationary portion 130 and an intermediate rotating portion 132.

The intermediate stationary portion 130 includes a first intermediate cylindrical portion 140, an intermediate bearing 142, and five intermediate ribs 144. The first intermediate cylindrical portion 140, the intermediate bearing 142, and the five intermediate ribs 144 are integrated. As shown in FIG. 3, an outer diameter of the first intermediate cylindrical portion 140 is same as the inner diameter of the main body casing 100. Center axes of the first intermediate cylindrical portion 140 and the intermediate bearing 142 coincide with the center axis A. An upstream end of the first intermediate cylindrical portion 140 is connected to a downstream end of the upstream fine bubble generation portion 110. The intermediate bearing 142 is disposed downstream of the intermediate stationary portion 130. As shown in FIGS. 8 and 9, the intermediate ribs 144 connect an inner wall of the first intermediate cylindrical portion 140 and an outer wall of the intermediate bearing 142. The intermediate ribs 144 extend orthogonal to the center axis A. The five intermediate ribs 144 are arranged at regular intervals along the circumferential direction about the center axis A. As shown in FIG. 3, an intermediate flow path 146 inside the intermediate fine bubble generation portion 112 is defined by the intermediate stationary portion 130 (more specifically the first intermediate cylindrical portion 140). A flow path axis of the intermediate flow path 146 coincides with the center axis A.

As shown in FIGS. 8 and 9, the intermediate rotating portion 132 includes a second intermediate cylindrical portion 150, an intermediate rotation shaft 152, and five intermediate vanes 154. The second intermediate cylindrical portion 150, the intermediate rotation shaft 152, and the intermediate vanes 154 are integrated. As shown in FIG. 3, an outer diameter of the second intermediate cylindrical portion 150 is slightly smaller than an inner diameter of the first intermediate cylindrical portion 140 of the intermediate stationary portion 130. Center axes of the second intermediate cylindrical portion 150 and the intermediate rotation shaft 152 coincide with the center axis A. That is, the second intermediate cylindrical portion 150 and the intermediate rotation shaft 152 extend along the flow path axis of the intermediate flow path 146. A downstream end of the intermediate rotation shaft 152 is attached to the intermediate bearing 142 of the intermediate stationary portion 130 so as to be rotatable about the center axis A. As shown in FIGS. 8 and 9, the intermediate vanes 154 are connected to an inner wall of the second intermediate cylindrical portion 150, extend radially outward from the inner wall of the second intermediate cylindrical portion 150, and are connected to an outer wall of the intermediate rotation shaft 152. As shown in FIG. 8, when the intermediate rotating portion 132 is seen from the upstream side along the center axis A, the intermediate vanes 154 are tilted down toward the downstream side along the clockwise direction. As shown in FIG. 3, water that flows from the upstream fine bubble generation portion 110 to the intermediate fine bubble generation portion 112 enters the downstream fine bubble generation portion 114 through the intermediate flow path 146.

(Configuration of Downstream Fine Bubble Generation Portion 114; FIGS. 3 to 5, 10, and 11)

Figure 10:
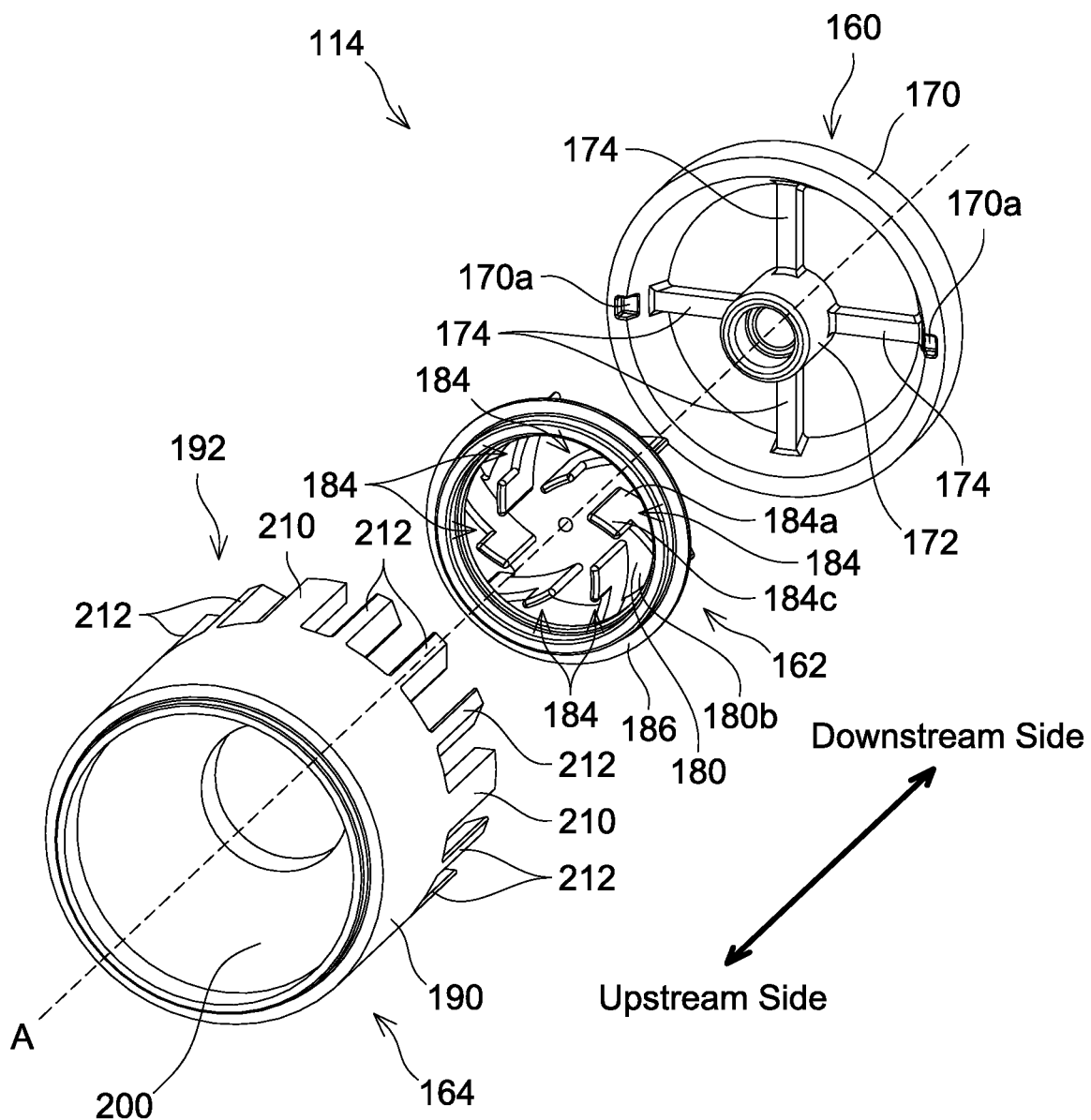
FIG. 10 is a disassembled diagram seeing a downstream fine bubble generation portion 114 of the embodiment from the upstream side.

Next, the downstream fine bubble generation portion 114 will be described with reference to FIGS. 3 to 5, 10, and 11. As shown in FIGS. 10 and 11, the downstream fine bubble generation portion 114 includes a first downstream stationary portion 160, a downstream rotating portion 162, and a second downstream stationary portion 164.

The first downstream stationary portion 160 includes a first downstream cylindrical portion 170, a downstream bearing 172, and four downstream ribs 174. The first downstream cylindrical portion 170, the downstream bearing 172, and the four downstream ribs 174 are integrated. As shown in FIG. 3, an outer diameter of the first downstream cylindrical portion 170 is same as the inner diameter of the main body casing 100. Center axes of the first downstream cylindrical portion 170 and the downstream bearing 172 coincide with the center axis A. A downstream end of the first downstream cylindrical portion 170 contacts an upstream end of the outlet 104. As shown in FIG. 10, two recesses 170a are arranged at an upstream end of the first downstream cylindrical portion 170. The downstream ribs 174 connect an inner wall of the first downstream cylindrical portion 170 and an outer wall of the downstream bearing 172. The downstream ribs 174 extend orthogonal to the center axis A. The four downstream ribs 174 are arranged at regular intervals along the circumferential direction about the center axis A.

Figure 14:
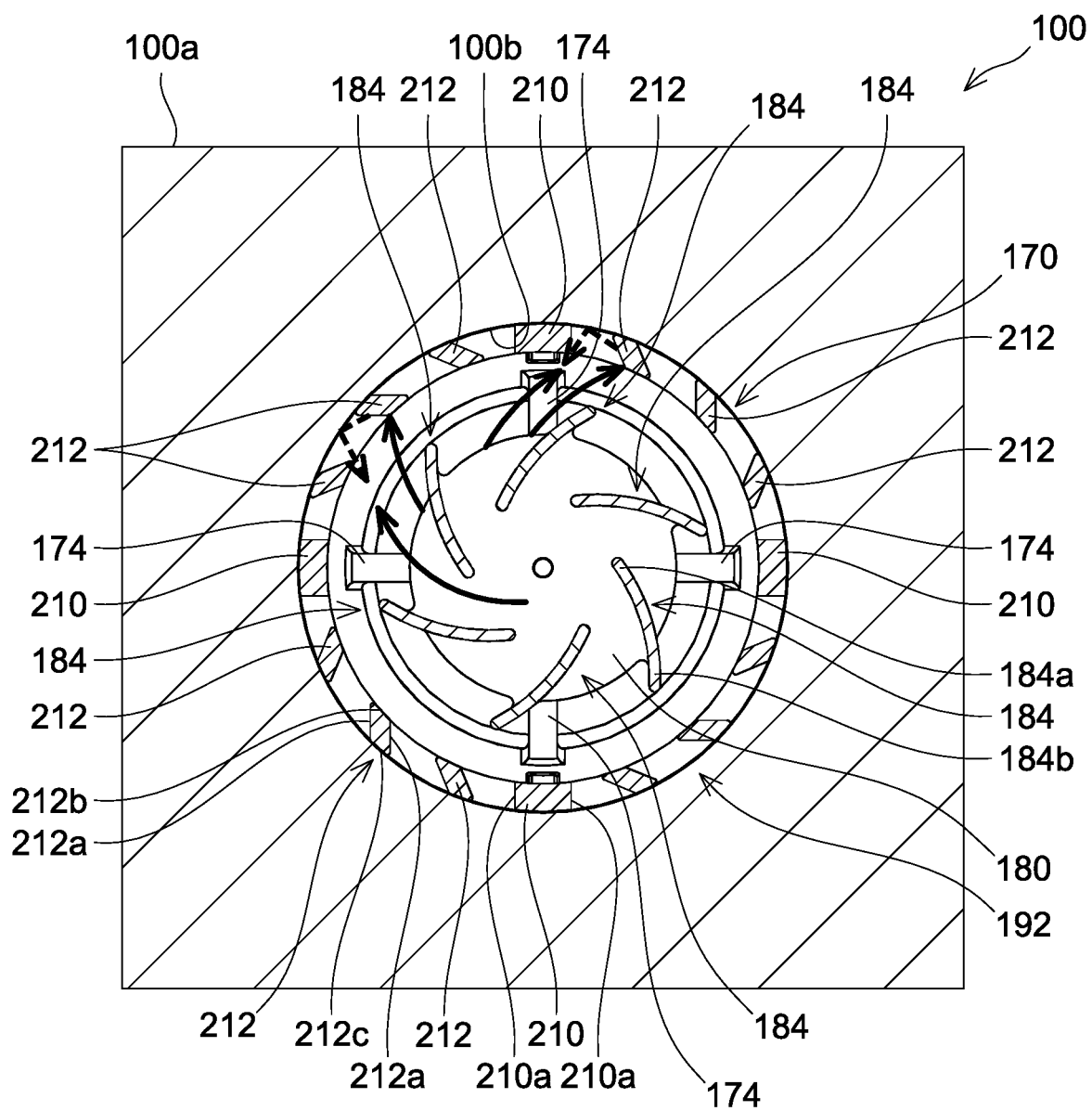
FIG. 14 is a cross-sectional view along a line XIV-XIV of FIG. 3.

As shown in FIGS. 10 and 11, the downstream rotating portion 162 includes a disc 180, a downstream rotation shaft 182, downstream vanes 184, and a flange 186. As shown in FIG. 3, the disc 180 is disposed orthogonal to a flow path axis of a downstream flow path 222 to be described later. The flow path axis of the downstream flow path 222 coincides with the center axis A of the fine bubble generator 46. Further, a center axis of the disc 180 coincides with the center axis A of the fine bubble generator 46, that is, coincides with the flow path axis of the downstream flow path 222. As shown in FIG. 11, the downstream rotation shaft 182 extends to the downstream side from a downstream surface 180a of the disc 180. As shown in FIG. 3, a downstream end of the downstream rotation shaft 182 is attached to the downstream bearing 172 of the first downstream stationary portion 160 so as to be rotatable about the center axis A. An outer diameter of the disc 180 is smaller than an inner diameter of the first downstream cylindrical portion 170. A central area of the disc 180 on an upstream surface 180b protrudes toward the upstream side. As shown in FIG. 10, the downstream vanes 184 are disposed on the upstream surface 180b of the disc 180. As shown in FIG. 14, when the downstream vanes 184 are seen from the upstream side along the center axis A, each of the downstream vanes 184 is curved such that an inner end 184a located inward along a radial direction of the center axis A is positioned on a counterclockwise side than an outer end 184b that is located outward along the radial direction of the center axis A is. A center portion of each downstream vane 184 is located on the counterclockwise side of a virtual line connecting the inner end 184a and the outer end 184b. In each of the downstream vanes 184, the outer end 184b extends out beyond the disc 180. As shown in FIG. 10, each of the downstream vanes 184 further includes an extended portion 184c extending toward the upstream side from the inner end 184a. The flange 186 is disposed radially outside the extended portions 184c. The flange 186 is disposed on upstream surfaces of the outer ends 184b.

As shown in FIG. 10, the second downstream stationary portion 164 includes a guiding portion 190 and an axial extension portion 192. The guiding portion 190 has a cylindrical shape. As shown in FIG. 3, an outer diameter of the guiding portion 190 is same as the inner diameter of the main body casing 100. A center axis of the guiding portion 190 coincides with the center axis A. A guide flow path 200 of which flow path diameter decreases from upstream to downstream is defined in the guiding portion 190. The flow path diameter of the guide flow path 200 on the upstream side is same as the flow path diameter at the downstream end of the first intermediate cylindrical portion 140 of the intermediate fine bubble generation portion 112. The flow path diameter of the guide flow path 200 on the downstream side is smaller than the outer diameter of the disc 180.

As shown in FIG. 11, the axial extension portion 192 includes four first axial extension portions 210 and twelve second axial extension portions 212. The first axial extension portions 210 and the second axial extension portions 212 extend toward the downstream side from a downstream end of the guiding portion 190. As shown in FIG. 14, the first axial extension portions 210 and the second axial extension portions 212 are arranged at regular intervals along the circumferential direction about the center axis A. A diameter of a circle obtained by connecting outer walls of the first axial extension portions 210 and outer walls of the second axial extension portions 212 is same as the inner diameter of the main body casing 100. Three second axial extension portions 212 are disposed between each pair of first axial extension portions 210 adjacent to each other in the circumferential direction of the center axis A. When the fine bubble generator 46 is seen along the center axis A direction, side walls 210a of each first axial extension portion 210 are parallel to a virtual line connecting the center axis A and a central area of the first axial extension portion 210 in the circumferential direction. Side walls 212a of each second axial extension portion 212 are each tilted such that an inner end 212b located on the inner side in the radial direction of the center axis A is located on the clockwise side than an outer end 212c located on the outer side in the radial direction is.

As shown in FIG. 11, among the four first axial extension portions 210, two first axial extension portions 210 that are disposed at positions corresponding to the recesses 170a of the first downstream cylindrical portion 170 of the first downstream stationary portion 160 (see FIG. 10) each include a projection 210b at its downstream end. As shown in FIG. 3, a collision flow path 220 is defined by the inner wall 100b of the main body casing 100 located radially outside the axial extension portion 192. The downstream flow path 222 in the downstream fine bubble generation portion 114 is defined by the guide flow path 200 and the collision flow path 220. Hereinbelow, a portion of the inner wall 100b of the main body casing 100 that defines the collision flow path 220 may be termed "collision flow path wall".

Next, fine bubbles generated by the fine bubble generator 46 will be described with reference to FIGS. 3 and 12 to 14. Solid-line arrows in FIGS. 13 and 14 and broken-line arrows in FIG. 14 indicate directions of water flow. The fine bubble generator 46 of the present embodiment is configured to generate fine bubbles using air contained in the water supplied from the water source 4, such as the public tap water system. The water supplied from the public tap water system has air (oxygen, carbon dioxide, nitrogen, etc.) dissolved therein. Hereinbelow, water in which air is dissolved will be termed "air-dissolved water". Further, hereinbelow, explanation will be given by assuming a situation in which the faucet 6 is operated by a user. As shown in FIG. 1, when the faucet 6 is operated by the user, the first burner 22 of the first heating device 10 operates with the reheating control valve 52 closed. The air-dissolved water supplied from the water source 4 to the water supply passage 30 is heated by heat exchange in the first heat exchanger 24, and then flows into the fine bubble generator 46 through the first hot water supply passage 32a.

Prior to explaining the fine bubbles generated by the fine bubble generator 46, reason why the fine bubble generator 46 is disposed on the first hot water supply passage 32a will be described. A dissolved air quantity indicating a quantity of air dissolvable in water becomes smaller in water with higher temperature. Further, bubbles are generated easier when the quantity of air dissolved in water is closer to the dissolved air quantity. Although details will be given later, in the fine bubble generator 46, bubbles are generated in the air-dissolved water, and fine bubbles are generated by refining the bubbles. Due to this, a volume of the fine bubbles can be increased when a larger volume of bubbles are generated from the air-dissolved water. Due to this reason, the fine bubble generator 46 in the present embodiment is disposed on the first hot water supply passage 32a where the water heated by the first heating device 10 flows.

As shown in FIG. 3, the air-dissolved water that flowed into the fine bubble generator 46 flows through the inlet opening 102a of the inlet 102 and into the upstream flow path 126 in the upstream fine bubble generation portion 110. The air-dissolved water that flowed into the upstream flow path 126 then flows into the venturi portions 120a to 120h. For example, the air-dissolved water that flowed into the venturi portion 120a flows into the diameter-reducing flow path 122a. The air-dissolved water that flowed into the diameter-reducing flow path 122a increases its flow speed as it flows through the diameter-reducing flow path 122a, and its pressure is reduced as a result. Bubbles are generated as a result of the pressure of the air-dissolved water being reduced. The air-dissolved water that flowed through the diameter-reducing flow path 122a flows into the diameter-increasing flow path 124a. The air-dissolved water that flowed into the diameter-increasing flow path 124a reduces its flow speed as it flows through the diameter-increasing flow path 124a, and its pressure is increased as a result. When the pressure of the air-dissolved water is increased after the bubbles were generated by the pressure reduction, the bubbles contained in the air-dissolved water break up into fine bubbles. The water that flowed through the diameter-increasing flow path 124a flows into the intermediate flow path 146 of the intermediate fine bubble generation portion 112. As above, the fine bubbles are generated as a result of the air-dissolved water flowing through the venturi portion 120a. Fine bubbles are also generated in the air-dissolved water that flows through the venturi portions 120b to 120h as the air-dissolved water flows through the venturi portions 120b to 120h. The air-dissolved water that flowed through the upstream flow path 126 in the upstream fine bubble generation portion 110 flows into the intermediate flow path 146 of the intermediate fine bubble generation portion 112.

The air-dissolved water that flowed into the intermediate flow path 146 of the intermediate fine bubble generation portion 112 collides with the intermediate vanes 154 of the intermediate rotating portion 132. As shown in FIG. 12, the intermediate vanes 154 rotate in the counterclockwise direction due to the air-dissolved water colliding with the intermediate vanes 154. Then, when the air-dissolved water flows past the intermediate vanes 154 that are rotating in the counterclockwise direction, the fine bubbles in the air-dissolved water are sheared, as a result of which the fine bubbles in the air-dissolved water are further refined into finer bubbles, and the volume of the fine bubbles further increases. Further, the water that flows past the intermediate vanes 154 flows downstream while swirling in the clockwise direction.

Figure 13:
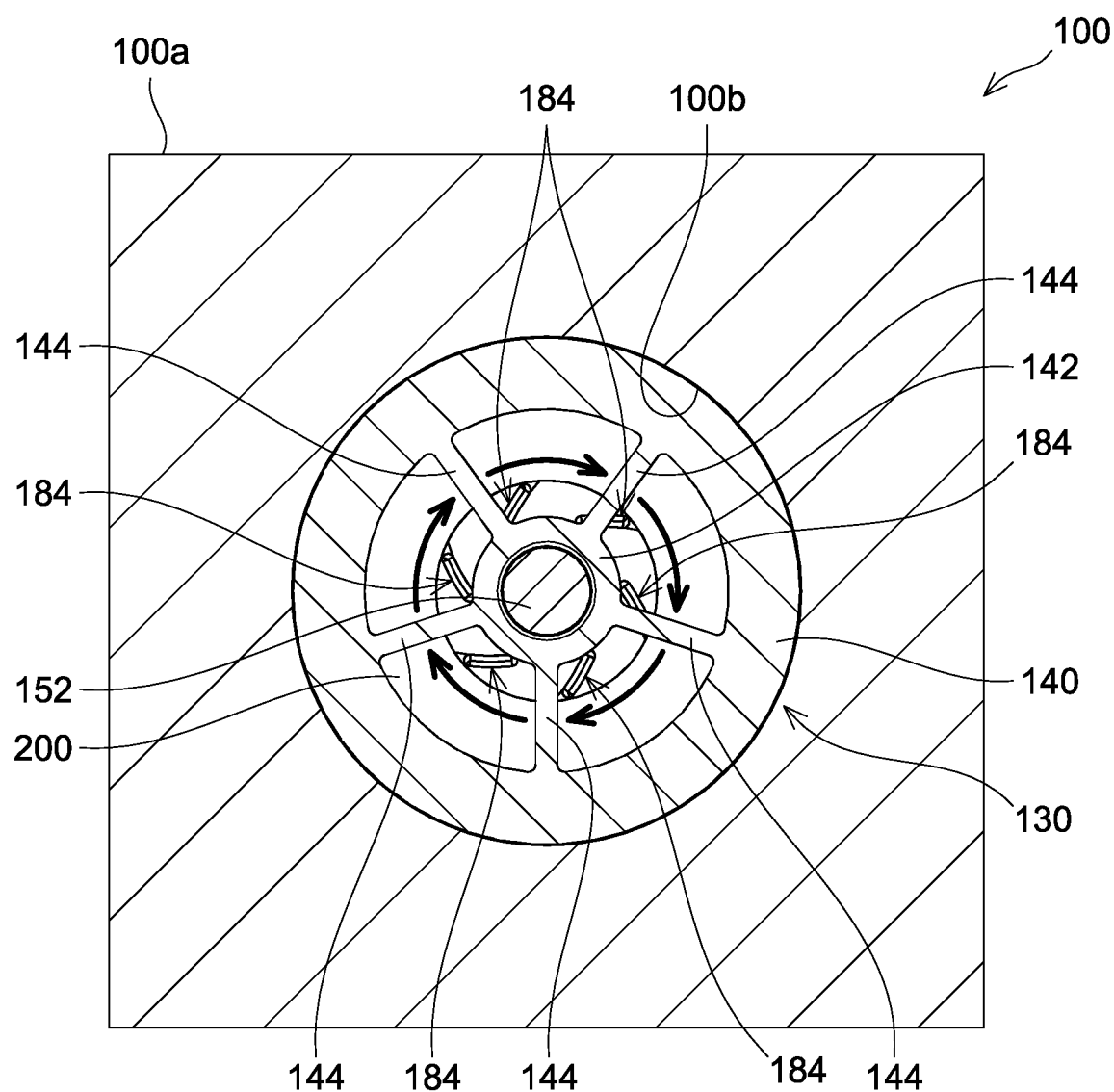
FIG. 13 is a cross-sectional view along a line XIII-XIII of FIG. 3.

Next, the air-dissolved water that flowed past the intermediate vanes 154 swirls in the clockwise direction and reaches the intermediate ribs 144. Then, as shown in FIG. 13, when the air-dissolved water flows past the intermediate ribs 144, the fine bubbles in the air-dissolved water are sheared by the intermediate ribs 144, as a result of which the fine bubbles in the air-dissolved water are further refined into finer bubbles, and the volume of the fine bubbles further increases. As shown in FIG. 3, the air-dissolved water that flowed through the intermediate flow path 146 of the intermediate fine bubble generation portion 112 flows into the downstream flow path 222 of the downstream fine bubble generation portion 114.

The air-dissolved water that flowed into the downstream flow path 222 of the downstream fine bubble generation portion 114 flows into the guide flow path 200. As mentioned above, the flow path axis of the guide flow path 200 coincides with the center axis of the disc 180. Due to this, the gas-dissolved water that flows through the guide flow path 200 of which diameter decreases from upstream to downstream is guided to the upstream side of the disc 180 of the downstream rotating portion 162 and in a center direction toward the flow path axis of the downstream flow path 222 (that is, in a center direction of the disc 180). Due to this, majority of the air-dissolved water that flowed through the guide flow path 200 collides onto vicinity of a central area of the disc 180. When the air-dissolved water collides with the disc 180, it flows along the upstream surface 180b of the disc 180 and the downstream vanes 184. The downstream rotating portion 162 rotates in the counterclockwise direction due to the air-dissolved water flowing along the upstream surface 180b of the disc 180 and the downstream vanes 184. Then, as shown in FIG. 14, the air-dissolved water flows out from the downstream rotating portion 162 as it is guided radially outward and flowing in the clockwise direction. The air-dissolved water that flowed out from the downstream rotating portion 162 radially outward collides with the collision flow path wall (that is, inner wall 100b), the first axial extension portions 210, and the second axial extension portions 212. When the air-dissolved water collides with the collision flow path wall, the first axial extension portions 210, and the second axial extension portions 212, the fine bubbles in the air-dissolved water break up and are refined into finer bubbles, and the volume of the fine bubbles further increases. Further, a part of the air-dissolved water collides with the side walls 212a of the second axial extension portions 212 and thereafter collides with the collision flow path wall. Further, a part of the air-dissolved water collides with the side walls 212a of the second axial extension portions 212 and the collision flow path wall in this order, and further collides with the air-dissolved water that was guided off of the disc 180. Due to the air-dissolved water colliding with the collision flow path wall, the first axial extension portions 210, the second axial extension portions 212, and the air-dissolved water, the fine bubbles in the air-dissolved water are refined into even finer bubbles, and the volume of the fine bubbles further increases.

According to the above configuration, as shown in FIGS. 2 to 5, the fine bubble generator 46 includes the inlet 102, the outlet 104, the upstream fine bubble generation portion 110 disposed between the inlet 102 and the outlet 104 and including the upstream flow path 126, and the downstream fine bubble generation portion 114 disposed between the upstream fine bubble generation portion 110 and the outlet 104 and including the downstream flow path 222. As shown in FIGS. 3, 6, and 7, the upstream flow path 126 includes the diameter-reducing flow paths 122a to 122f and the diameter-increasing flow paths 124a to 124f disposed downstream of the diameter-reducing flow paths 122a to 122f. As shown in FIGS. 3, 10 and 11, the downstream flow path 222 includes the guide flow path 200 that guides the air-dissolved water, which flowed into the downstream flow path 222, in the center direction toward the flow path axis of the downstream flow path 222, and the collision flow path 220 defined by the collision flow path wall. The downstream bearing 172 and the downstream rotating portion 162 rotatably attached to the downstream bearing 172 are disposed on the collision flow path 220. The downstream rotating portion 162 is disposed at a position where the water that flowed through the guide flow path 200 collides thereon, and includes the disc 180 disposed orthogonal to the flow path axis of the downstream flow path 222, the downstream rotation shaft 182 disposed on the downstream surface of the disc 180 and rotatably attached to the downstream bearing 172, and the downstream vanes 184 disposed on the upstream surface of the disc 180. As shown in FIG. 3, the air-dissolved water flows through the inlet 102 and into the diameter-reducing flow paths 122a to 122f of the upstream fine bubble generation portion 110. When the air-dissolved water flows through the diameter-reducing flow paths 122a to 122f, its flow speed increases, and its pressure is reduced as the result. When the pressure of the air-dissolved water is reduced, the bubbles are generated. Then, the air-dissolved water flows through the diameter-increasing flow paths 124a to 124f, as the result of which its pressure is gradually increased. When the pressure of the air-dissolved water is increased after the bubbles were generated by the pressure reduction, the bubbles contained in the air-dissolved water break up into fine bubbles. The air-dissolved water that flowed through the upstream fine bubble generation portion 110 flows into the downstream fine bubble generation portion 114. As shown in FIG. 14, the air-dissolved water that flows into the downstream fine bubble generation portion 114 flows through the guide flow path 200, and collides with the disc 180 of the downstream rotating portion 162 disposed on the collision flow path 220. Since the air-dissolved water that flowed into the downstream fine bubble generation portion 114 is guided by the guide flow path 200 in the center direction toward the flow path axis of the downstream flow path 222, that is, in the center direction of the disc 180, the majority of the air-dissolved water collides onto the vicinity of the central area of the disc 180. Since the downstream vanes 184 are disposed on the upstream surface 180b of the disc 180, the water that collided on the disc 180 flows along the downstream vanes 184, as the result of which the disc 180 rotates relative to the downstream bearing 172. As the disc 180 rotates relative to the downstream bearing 172, the water that flowed along the downstream vanes 184 are guided off of the disc 180 radially outward, and collides with the collision flow path wall that defines the collision flow path 220. Due to the air-dissolved water colliding with the collision flow path wall, the fine bubbles that were generated in the upstream fine bubble generation portion 110 break up into even finer bubbles, and the volume of the fine bubbles increases. Thus, the fine bubbles can be generated in large volume.

Further, as shown in FIGS. 2 to 5, the fine bubble generator 46 further includes the intermediate fine bubble generation portion 112 disposed between the upstream fine bubble generation portion 110 and the outlet 104 and including the intermediate flow path 146. As shown in FIGS. 3, 8 and 9, the intermediate flow path 146 includes the intermediate bearing 142, the intermediate rotation shaft 152 rotatably attached to the intermediate bearing 142 and extending along the flow path axis of the intermediate flow path 146, and the intermediate rotating portion 132 connected to the intermediate rotation shaft 152 and including the intermediate vanes 154 extending radially outward from the intermediate rotation shaft 152. According to the above configuration, the air-dissolved water that flowed through the upstream fine bubble generation portion 110 flows into the intermediate flow path 146 of the intermediate fine bubble generation portion 112. As shown in FIG. 12, the intermediate vanes 154 rotate relative to the intermediate bearing 142 by the air-dissolved water colliding with the intermediate vanes 154 of the intermediate rotating portion 132 disposed on the intermediate flow path 146. Further, the fine bubbles in the air-dissolved water flowing past the intermediate vanes 154 are sheared by the rotating intermediate vanes 154 as the air-dissolved water flows through the intermediate rotating portion 132. Due to this, the fine bubbles in the air-dissolved water are refined into finer bubbles, and the volume of the fine bubbles further increases.

Further, as shown in FIGS. 8 and 9, the intermediate fine bubble generation portion 112 further includes the intermediate ribs 144 disposed downstream than the intermediate vanes 154 are and connecting the intermediate bearing 142 with the first intermediate cylindrical portion 140 defining the intermediate flow path 146. According to the above configuration, as shown in FIG. 13, when the air-dissolved water that flowed through the intermediate rotating portion 132 flows past the intermediate ribs 144, the fine bubbles in the air-dissolved water are sheared by the intermediate ribs 144. Due to this, the fine bubbles in the air-dissolved water are refined into finer bubbles, and the volume of the fine bubbles further increases.

Further, as shown in FIG. 3, the downstream fine bubble generation portion 114 is disposed between the intermediate fine bubble generation portion 112 and the outlet 104. As shown in FIG. 14, in the downstream fine bubble generation portion 114, the flowing direction of the air-dissolved water dynamically changes by the air-dissolved water colliding with the disc 180 and the collision flow path wall. On the other hand, as shown in FIGS. 12 and 13, in the intermediate fine bubble generation portion 112, the flowing direction of the air-dissolved water does not change dynamically. Due to this, a pressure loss in the downstream flow path 222 of the downstream fine bubble generation portion 114 is greater than a pressure loss in the intermediate flow path 146 of the intermediate fine bubble generation portion 112, as a result of which the flow of the air-dissolved water is prone to stagnation. By causing the air-dissolved water of which flow has not yet stagnated to flow into the intermediate fine bubble generation portion 112, the fine bubbles can be generated in large volume. According to the above configuration, as compared to a configuration in which the intermediate fine bubble generation portion 112 is disposed between the downstream fine bubble generation portion 114 and the outlet 104, the pressure loss that occurs before flowing into the intermediate fine bubble generation portion 112 can be reduced, and the air-dissolved water of which flow has not yet stagnated flows into the intermediate fine bubble generation portion 112. Thus, in the intermediate fine bubble generation portion 112, the air-dissolved water can more easily be sheared, as the result of which a larger volume of the fine bubbles can be generated.

Further, as shown in FIGS. 3, 10, and 11, the collision flow path 220 further includes the axial extension portion 192 disposed between the collision flow path wall and the downstream rotating portion 162 in the radial direction of the downstream rotation shaft 182 and extending along the axial direction of the downstream rotation shaft 182. According to the above configuration, as shown in FIG. 14, a part of the air-dissolved water that was guided off the disc 180 radially outward collides with the axial extension portion 192, and thereafter collides with the collision flow path wall. Due to this, as compared to a configuration in which the axial extension portion 192 is not arranged on the collision flow path 220, the number of times the air-dissolved water collides can be increased. Thus, the fine bubbles in the air-dissolved water are further refined into finer bubbles, and the volume of the fine bubbles further increases.

Further, as shown in FIG. 14, the downstream vanes 184 each have the inner end 184a located on the counterclockwise side than the outer end 184b is, and the second axial extension portions 212 each have the inner end 212b located on the clockwise side than the outer end 212c is. According to the above configuration, the disc 180 rotates in the counterclockwise direction relative to the downstream bearing 172 due to the air-dissolved water, which collided with the disc 180, flowing past the downstream vanes 184. Further, the air-dissolved water guided off of the downstream rotating portion 162 radially outward flows in this radially outward direction as it is flowing in the clockwise direction. As above, the inner end 212b of each second axial extension portion 212 is located on the clockwise side than its outer end 212c is. If the inner end 212b of each second axial extension portion 212 is located on the counterclockwise side than its outer end 212c is, the air-dissolved water guided radially outward while flowing in the clockwise direction would tend to flow along the side walls 212a of the second axial extension portions 212. Due to this, the air-dissolved water would be less likely to collide with the second axial extension portions 212 (more specifically, the side walls 212a). To the contrary, in the present embodiment, since the inner end 212b of each second axial extension portion 212 is located on the clockwise side than its outer end 212c is, the air-dissolved water guided radially outward while flowing in the clockwise direction easily collides with the second axial extension portions 212 (more specifically, the side walls 212a). Further, the air-dissolved water that collided with the second axial extension portions 212 (more specifically, the side walls 212a) then flows radially outward, that is, toward the collision flow path wall. Due to this, the air-dissolved water that collided with the second axial extension portions 212 (more specifically, the side walls 212a) can be brought to collide with the collision flow path wall. Thus, the number of times the air-dissolved water collides can be increased, by which the fine bubbles in the air-dissolved water are refined into finer bubbles, and the volume of the fine bubbles further increases.

(Corresponding Relationship)

The air-dissolved water is an example of "gas-dissolved water". The upstream fine bubble generation portion 110 is an example of "first fine bubble generation portion". The upstream flow path 126 is an example of "first flow path". The downstream fine bubble generation portion 114 is an example of "second fine bubble generation portion". The downstream flow path 222 is an example of "second flow path". The part of the inner wall 100b of the main body casing 100 defining the collision flow path 220 is an example of "collision flow path wall". The downstream bearing 172 is an example of "first bearing". The downstream rotating portion 162 is an example of "first impeller". The downstream rotation shaft 182 is an example of "first rotation shaft". The downstream vanes 184 are an example of "one or more first vanes". The intermediate fine bubble generation portion 112 is an example of "third fine bubble generation portion". The intermediate flow path 146 is an example of "third flow path". The intermediate bearing 142 is an example of "second bearing". The intermediate rotating portion 132 is an example of "second impeller". The intermediate rotation shaft 152 is an example of "second rotation shaft". The intermediate vanes 154 are an example of "one or more second vanes". The first intermediate cylindrical portion 140 is an example of "cylindrical portion". The intermediate ribs 144 are examples of "rib". The axial extension portion 192, the first axial extension portions 210, and the second axial extension portions 212 are examples of "axial extension portion". The inner end 184a and the outer end 184b of the downstream vanes 184 are respectively an example of "first end" and "second end". The inner end 212b and the outer end 212c of the second axial extension portions 212 are respectively an example of "third end" and "fourth end". The counterclockwise direction and the clockwise direction in FIG. 14 are respectively an example of "first rotation direction" and "second rotation direction".

Specific examples of the present disclosure have been described in detail, however, these are mere exemplary indications and thus do not limit the scope of the claims. The art described in the claims includes modifications and variations of the specific examples presented above.

(First Variant) The position where the fine bubble generator 46 is disposed is not limited to the first hot water supply passage 32a. The fine bubble generator 46 may be disposed on the water supply passage 30, the bathtub-filling passage 50, the reheating passage 60, the first bathtub circulation passage 62, and/or the second bathtub circulation passage 68.

(Second Variant) In the above hot water supply system 2, the fine bubbles are generated using the air contained in the water supplied from the water source 4 such as the public tap water system. In a variant, the hot water supply system 2 may include an air-dissolved water generation device that dissolves air taken in from outside into water. Further, the air-dissolved water generated by the air-dissolved water generation device may be supplied to the fine bubble generator 46. Further, in another variant, an air introduction passage for introducing air from outside may be disposed at a connection between the diameter-reducing flow paths 122a to 122f and the diameter-increasing flow paths 124a to 124f of the upstream fine bubble generation portion 110. Further, gases such as carbon dioxide, hydrogen, and/or oxygen may be dissolved in water instead of the air.

(Third Variant) The fine bubble generator 46 may not include the intermediate fine bubble generation portion 112.

(Fourth Variant) The intermediate fine bubble generation portion 112 may not include the first intermediate cylindrical portion 140 of the intermediate stationary portion 130. In the present variant, the intermediate ribs 144 connect the inner wall 100b of the main body casing 100 and the outer wall of the intermediate bearing 142. In the present variant, the intermediate flow path 146 is defined by a part of the inner wall 100b of the main body casing 100 (an example of "wall that defines the third flow path").

(Fifth Variant) The numbers of the upstream fine bubble generation portion 110, the intermediate fine bubble generation portion 112, and the downstream fine bubble generation portion 114 are not limited to one, and the fine bubble generator 46 may include two or more upstream fine bubble generation portions 110, two or more intermediate fine bubble generation portions 112, and/or two or more downstream fine bubble generation portions 114.

(Sixth Variant) The upstream fine bubble generation portion 110, the intermediate fine bubble generation portion 112, and the downstream fine bubble generation portion 114 may be disposed in the order of the upstream fine bubble generation portion 110, the downstream fine bubble generation portion 114, and the intermediate fine bubble generation portion 112 from the upstream side to the downstream side.

(Seventh Variant) The intermediate fine bubble generation portion 112 may not include the intermediate ribs 144.

(Eighth Variant) The downstream fine bubble generation portion 114 may not include the axial extension portion 192.

(Ninth Variant) The axial extension portion 192 may be constituted only of the first axial extension portions 210 or only of the second axial extension portions 212.

Technical features described in the description and the drawings may technically be useful alone or in various combinations, and are not limited to the combinations as originally claimed. Further, the art described in the description and the drawings may concurrently achieve a plurality of aims, and technical significance thereof resides in achieving any one of such aims.

What is claimed is:

1. A fine bubble generator comprising:
   an inlet into which gas-dissolved water in which gas is dissolved flows;
   an outlet out of which the gas-dissolved water flows;
   a first fine bubble generation portion disposed between the inlet and the outlet and comprising a first flow path; and
   a second fine bubble generation portion disposed between the first fine bubble generation portion and the outlet and comprising a second flow path,
   wherein the first flow path comprises:
     a diameter-reducing flow path, wherein a flow path diameter of the diameter-reducing flow path reduces from upstream to downstream, and
     a diameter-increasing flow path disposed downstream of the diameter-reducing flow path, wherein a flow path diameter of the diameter-increasing flow path increases from upstream to downstream,
   the second flow path comprises:
     a guide flow path guiding the gas-dissolved water flowing into the second flow path in a center direction toward a flow path axis of the second flow path, and
     a collision flow path disposed downstream of the guide flow path and defined by a collision flow path wall,
   wherein a first bearing and a first impeller rotatably attached to the first bearing are disposed on the collision flow path,
   wherein the first impeller comprises:
     a disc disposed at a position at which the gas-dissolved water having passed through the guide flow path collides with the disc and disposed orthogonal to the flow path axis of the second flow path;
     a first rotation shaft disposed on a downstream surface of the disc and rotatably attached to the first bearing; and
     one or more first vanes disposed on an upstream surface of the disc.

2. The fine bubble generator according to claim 1, further comprising
   a third fine bubble generation portion disposed between the first fine bubble generation portion and the outlet and comprising a third flow path;
   wherein a second bearing and a second impeller are disposed on the third flow path,
   wherein the second impeller comprises:
     a second rotation shaft rotatably attached to the second bearing and extending along a flow path axis of the third flow path; and
     one or more second vanes connected to the second rotation shaft and extending radially outward from the second rotation shaft.

3. The fine bubble generator according to claim 2, wherein the third fine bubble generation portion further comprises
   a rib disposed downstream of the one or more second vanes and connecting the second bearing and a wall that defines the third flow path.

4. The fine bubble generator according to claim 2, wherein the second fine bubble generation portion is disposed between the third fine bubble generation portion and the outlet.

5. The fine bubble generator according to claim 1, wherein an axial extension portion is further disposed on the collision flow path, wherein the axial extension portion is disposed between the collision flow path wall and the first impeller in a radial direction of the first rotation shaft, and extends in an axial direction of the first rotation shaft.

6. The fine bubble generator according to claim 5, wherein each of the one or more first vanes comprises a first end disposed on an inner side in the radial direction of the first rotation shaft and a second end on an outer side in the radial direction of the first rotation shaft, the first end is disposed more on a first rotation direction side than the second end is, wherein the axial extension portion comprises a third end on the inner side in the radial direction and a fourth end disposed on the outer side in the radial direction, the third end is disposed more on a second rotation direction side than the fourth end is, and the second rotation direction side is opposite to the first rotation direction side.

7. A fine bubble generator comprising:

an inlet into which gas-dissolved water in which gas is dissolved flows;

an outlet out of which the gas-dissolved water flows;

a first fine bubble generation portion disposed between the inlet and the outlet and comprising a first flow path;

a second fine bubble generation portion disposed between the first fine bubble generation portion and the outlet and comprising a second flow path, and a third fine bubble generation portion disposed between the first fine bubble generation portion and the outlet and comprising a third flow path, wherein the first flow path comprises:

a diameter-reducing flow path, wherein a flow path diameter of the diameter-reducing flow path reduces from upstream to downstream, and a diameter-increasing flow path disposed downstream of the diameter-reducing flow path, wherein a flow path diameter of the diameter-increasing flow path increases from upstream to downstream, the second flow path comprises:

a guide flow path guiding the gas-dissolved water flowing into the second flow path in a center direction toward a flow path axis of the second flow path, and a collision flow path disposed downstream of the guide flow path and defined by a collision flow path wall, wherein a first bearing and a first impeller rotatably attached to the first bearing are disposed on the collision flow path, wherein the first impeller comprises:

a disc disposed at a position at which the gas-dissolved water having passed through the guide flow path collides with the disc and disposed orthogonal to the flow path axis of the second flow path;

a first rotation shaft disposed on a downstream surface of the disc and rotatably attached to the first bearing; and one or more first vanes disposed on an upstream surface of the disc, wherein a second bearing and a second impeller are disposed on the third flow path, wherein the second impeller comprises:

a second rotation shaft rotatably attached to the second bearing and extending along a flow path axis of the third flow path;

one or more second vanes connected to the second rotation shaft and extending radially outward from the second rotation shaft; and a rib disposed downstream of the one or more second vanes and connecting the second bearing and a wall that defines the third flow path, wherein the second fine bubble generation portion is disposed between the third fine bubble generation portion and the outlet, wherein an axial extension portion is further disposed on the collision flow path, wherein the axial extension portion is disposed between the collision flow path wall and the first impeller in a radial direction of the first rotation shaft, and extends in an axial direction of the first rotation shaft, wherein each of the one or more first vanes comprises a first end disposed on an inner side in the radial direction of the first rotation shaft and a second end on an outer side in the radial direction of the first rotation shaft, the first end is disposed more on a first rotation direction side than the second end is, wherein the axial extension portion comprises a third end on the inner side in the radial direction and a fourth end disposed on the outer side in the radial direction, the third end is disposed more on a second rotation direction side than the fourth end is, and the second rotation direction side is opposite to the first rotation direction side.

* * * * *